US012649486B2

(12) United States Patent
Buchet et al.

(10) Patent No.: US 12,649,486 B2
(45) Date of Patent: Jun. 9, 2026

(54) AUTONOMOUS VEHICLES AND METHODS OF USING SAME

(71) Applicant: MOTHERSON INNOVATIONS COMPANY LIMITED, London (GB)

(72) Inventors: Yann Buchet, Göttingen (DE); Torsten Weingärtner, Göttingen (DE); Jan Dormanns, Göttingen (DE); Xavier Dreyer, Boetzingen (DE)

(73) Assignee: Motherson Innovations Company Limited, London (GB)

( * ) Notice: Subject to any disclaimer, the term of this patent is extended or adjusted under 35 U.S.C. 154(b) by 500 days.

(21) Appl. No.: 17/939,219

(22) Filed: Sep. 7, 2022

(65) Prior Publication Data

US 2023/0052099 A1      Feb. 16, 2023

Related U.S. Application Data

(63) Continuation-in-part of application No. 16/960,719, filed as application No. PCT/EP2019/050451 on Jan. 9, 2019, now Pat. No. 11,458,981.

(Continued)

(30) Foreign Application Priority Data

Sep. 29, 2021      (EP) ..................................... 21199873

(51) Int. Cl.
*G06F 3/041* (2006.01)
*B60K 35/10* (2024.01)
(Continued)

(52) U.S. Cl.
CPC ........... *B60W 60/001* (2020.02); *B60K 35/10* (2024.01); *B60K 35/22* (2024.01); *B60K 35/23* (2024.01);
(Continued)

(58) Field of Classification Search
CPC ........ G06F 3/0412; G06F 3/044; G06F 3/041; G06F 3/016; G06F 3/0445; G06F 3/0416;
(Continued)

(56) References Cited

U.S. PATENT DOCUMENTS 9,751,461 B2      9/2017   Vourlat
11,119,598 B2 *   9/2021   Laitinen .................. G06F 3/016
(Continued)

FOREIGN PATENT DOCUMENTS

CA        2896137 A1 *   7/2014    ......... A61H 15/0078
DE     102016201475 A1     8/2016
(Continued)

OTHER PUBLICATIONS

International Search Report and Written Opinion, dated Sep. 23, 2019 of International application No. PCT/EP2019/050451.
(Continued)

*Primary Examiner* — Lixi C Simpson
(74) *Attorney, Agent, or Firm* — Jones Day

(57) ABSTRACT

A system for receiving user input from an internal vehicle component surface includes a flat surface layer of the internal vehicle component that includes a first portion made of an elastic material and a second portion that surrounds the first portion, and a push-button assembly located beneath the first portion of the flat surface layer. The push-button assembly includes a push-button switch that is switched into at least a first switching state by downward pressure, and a vertical movement mechanism that when activated causes the push-button switch to move vertically in a direction of the flat surface layer. Vertical movement of the push-button switch causes a vertical displacement of the first portion of the flat surface layer, and downward pressure on the first portion of the flat surface layer when vertically displaced causes a corresponding downward pressure to the push- (Continued)

button switch, switching the push-button switch into the first switch state.

16 Claims, 29 Drawing Sheets

Related U.S. Application Data

(60) Provisional application No. 62/615,249, filed on Jan. 9, 2018.

(51) Int. Cl.

| | |
|---|---|
| *B60K 35/22* | (2024.01) |
| *B60K 35/23* | (2024.01) |
| *B60K 35/50* | (2024.01) |
| *B60K 35/60* | (2024.01) |
| *B60W 50/10* | (2012.01) |
| *B60W 50/14* | (2020.01) |
| *B60W 60/00* | (2020.01) |
| *G06F 3/01* | (2006.01) |
| *G06V 20/58* | (2022.01) |
| *B60K 35/28* | (2024.01) |

(52) U.S. Cl.
CPC .............. *B60K 35/50* (2024.01); *B60K 35/60* (2024.01); *B60W 50/10* (2013.01); *B60W 50/14* (2013.01); *G06V 20/58* (2022.01); *B60K 35/28* (2024.01); *B60W 2050/146* (2013.01); *B60W 2420/403* (2013.01)

(58) Field of Classification Search
CPC ......... G06F 1/1626; G06F 2203/04102; G06F 2203/04103
See application file for complete search history.

(56) References Cited

U.S. PATENT DOCUMENTS

| | | | | |
|---|---|---|---|---|
| 11,334,168 | B1 * | 5/2022 | Hrehor | ................... G06F 3/016 |
| 2010/0066113 | A1 | 3/2010 | Browne et al. | |
| 2012/0091744 | A1 | 4/2012 | McKnight et al. | |
| 2013/0156296 | A1 | 6/2013 | El Dokor | |
| 2014/0292665 | A1 | 10/2014 | Lathrop et al. | |
| 2015/0277735 | A1 * | 10/2015 | Gibson | ................... H04R 5/00 |
| | | | | 715/716 |
| 2016/0311323 | A1 | 10/2016 | Lee et al. | |
| 2018/0074694 | A1 * | 3/2018 | Lehmann | ................ G06F 3/016 |
| 2020/0139814 | A1 * | 5/2020 | Galan Garcia | ......... B32B 5/028 |
| 2021/0316446 | A1 * | 10/2021 | Leroy | ................... G06F 3/014 |

FOREIGN PATENT DOCUMENTS

| | | | |
|---|---|---|---|
| EP | | 2913228 A1 | 9/2015 |
| WO | WO 2017/159863 A1 | | 9/2017 |

OTHER PUBLICATIONS

European Office Action dated Dec. 16, 2021 of EP application No. 19701033.3-1012.

* cited by examiner

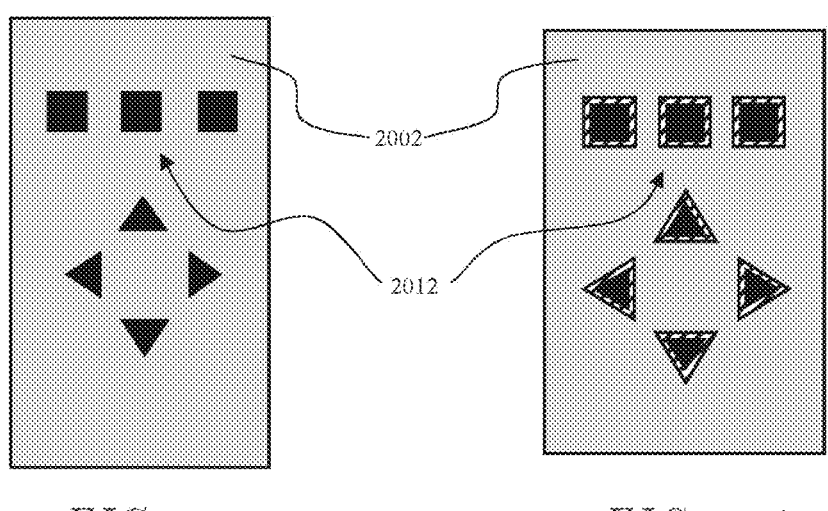
*FIG. 29a*            *FIG. 29b*
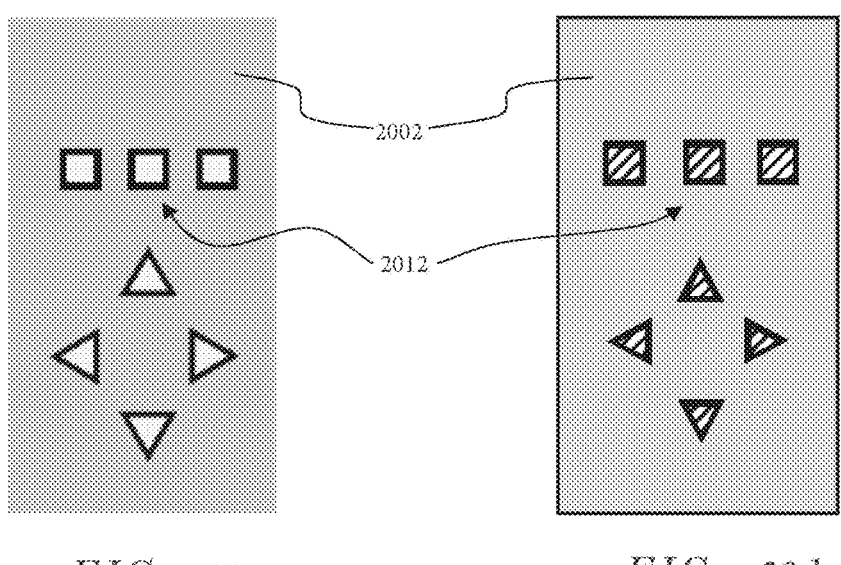
*FIG. 29c*            *FIG. 29d*

AUTONOMOUS VEHICLES AND METHODS OF USING SAME

CROSS-REFERENCE TO RELATED APPLICATIONS

This application is a continuation-in-part of U.S. application Ser. No. 16/960,719, filed on Jul. 8, 2020, which is a National Stage Entry of International Patent Application No. PCT/EP2019/050451, filed Jan. 9, 2019, which claims the benefit of priority to U.S. Provisional Patent Application No. 62/615,249, filed Jan. 9, 2018. This application also claims the benefit of priority to European Patent Application No. EP21199873.7, filed on Sep. 29, 2021. Each of these priority applications is hereby incorporated by reference in its entirety for all purposes.

TECHNICAL FIELD

The present disclosure relates generally to various aspects of autonomous driving vehicles and methods of using same. Such aspects include sensor arrangements, overlay surfaces for sensors and displays, holographic displays, full windshield head up displays, transparent dashboards, touch pads, display cooling features, see through displays, arrangement of camera monitoring systems, systems and methods for controlling one or more vehicle components using one or more sensors, and systems and methods for controlling the display of one or more images using one or more image capturing devices. The present disclosure also relates to a vehicle internal component and in particular to a sensor integrated vehicle internal component.

BACKGROUND

The autonomous control of cars is increasingly becoming more common. In the limiting case, intervention by the driver in the driving operation is no longer necessary. In such a motor vehicle, it is no longer necessary for the driver of the motor vehicle to assume the usual, forward-facing sitting position. It is quite conceivable that in the fully autonomous operation of such a motor vehicle, the driver, for example, may have a seat reclined in a rest position or, by rotation of his seat, occupies a position in which his view is directed to the occupants in a back seat of the motor vehicle or towards a seating group.

Even if direct intervention of the driver in the driving operation is no longer necessary, it is still desirable in such a situation for the driver or other occupants of the motor vehicle to obtain information about the current driving conditions. Moreover, in a sitting position where the driver's gaze is no longer directed in the direction of travel, there may be a problem with discomfort or nausea due to contradictory information regarding the driver's visual perception and sense of balance.

Further, multiple new applications are developed for improving experience and safety in autonomous vehicles. Such developments may include improvements to sensor arrangements, displays, dashboards, touch pads, cooling, and camera monitoring systems, among other aspects.

U.S. 2016/311323 A1 teaches a vehicle display apparatus and a method for controlling the same. The display apparatus includes a display and a controller configured to monitor a manipulation variable of a driving manipulation device provided to a vehicle, to select any one driving mode corresponding to the manipulation variable of the driving manipulation device from among a plurality of predetermined driving modes, and to control the display to display different information according to the plurality of driving modes. When a driving mode corresponding to a relatively small manipulation variable is selected, the controller decreases driving information displayed on the display and increases convenience information displayed on the display, as compared to when a driving mode corresponding to a relatively large manipulation variable is selected.

U.S. 2013/156296 A1 refers to a method and system for performing gesture recognition of a vehicle occupant employing a time of flight (TOF) sensor and a computing system in a vehicle. An embodiment of the method of the invention includes the steps of receiving one or more raw frames from the TOF sensor, performing clustering to locate one or more body part clusters of the vehicle occupant, calculating the location of the tip of the hand of the vehicle occupant, determining whether the hand has performed a dynamic or a static gesture, retrieving a command corresponding to one of the determined static or dynamic gestures, and executing the command.

U.S. 2014/292665 A1 A refers to a control system, components and methodologies that enable control of vehicle and in-vehicle system functionality via gesture recognition. In illustrative embodiments, the control system, constituent components and methodologies determine what functionality a user wishes to control by tracking the user's gaze to identify a selected function or function set. In combination with identifying the selected function and function set, one or more sensors installed in the vehicle detect one or more user gestures initiated by a user to interact with and/or control the selected function/function set.

U.S. 2012/091744 A1 teaches a holding fixture operable to secure differing pluralities of positioned objects having differing geometric shapes, sizes, and/or dimensions, including an active material element configured to selectively enable, cause, or retain the securing engagement and/or return the fixture to a ready state when not in use.

U.S. 2010/066113 A1 refers to a center console comprising a manipulable structural component, such as a pivotal lid, sliding armrest, tambour door, or pivotal cup holder, and at least one active material actuator including an active material element operable to undergo a reversible change, drivingly coupled to the component, and configured to autonomously cause and/or enable the component to be manipulated as a result of the change.

WO 2017/159863 A1 refers to an information processing device which is provided with a detection unit, a display control unit, and a determination unit. When the detection unit detects that the traveling direction of a vehicle is rearward, the determination unit determines that a prescribed condition is met, the display control unit switches from a composite image to a generated image and causes the generated image to be displayed by a display device.

EP 2 913 228 A1 teaches a passenger carrying vehicle comprising a vehicle body and a passenger compartment at least partly surrounded by the vehicle body, the vehicle body having an outer surface facing away from the passenger compartment and an inner surface facing the passenger compartment. The vehicle body is arranged to prevent a passenger located in the passenger compartment from gaining a direct view of a vehicle path in a primary direction of travel of the vehicle. The passenger compartment is thermally insulated and the vehicle comprises a sensor arrangement for gathering real-time data from the vehicle environment and a display arrangement comprising a display device which is located in the passenger compartment. The display arrangement is arranged to receive and display the real-time data from the sensor arrangement on the display device.

Generally, user interactive systems include sensors for receiving input from the user. The sensors are integrated inside the system and are covered by an outer surface. The user provides inputs through the outer surface having multiple input locations or buttons. Such systems also include a feedback module which provides a haptic feedback in response to the user's input such as a feeling that a mechanical button gives back when pressed. For this purpose, an actuator is used to give an impulse to the surface touched by the user. Conventionally, such systems include rigid or stiff surfaces, and when the actuator provides feedback in response to user's input, it is felt over the entire outer surface having multiple input locations or buttons. Receipt of the feedback over the entire surface brings confusion to the user as to which input location or button has been pressed.

WO 2019/173781 A1 discloses a system for human-computer interfacing. The system disclosed therein includes a touch sensor defining a touch sensor surface and extending over an array of sense electrode and drive electrode pairs; a vibrator coupled to the touch sensor surface; and a controller configured to: detect application of an input onto the touch sensor surface and a force magnitude of the first input at a first time; execute a down-click cycle in response to the force magnitude exceeding a threshold magnitude by driving the vibrator to oscillate the touch sensor surface; map a location of the input on the touch sensor surface to a key of a keyboard represented by the touch sensor surface; and output a touch image representing the key and the force magnitude of the input on the touch sensor surface at approximately the first time.

WO 2019/173781 A1 further discloses feedback system by using the vibrator, which is controlled by the controller. The vibrator is actuated by the controller after mapping the location of depressed area of the touch sensor surface. However, if two or more locations are pressed simultaneously on the touch sensor surface, then the feedback may not be received accurately at each depressed area independently. Further, it may not be possible to receive independent feedback for each input from the user.

It is an object of the present disclosure to provide a decoupling system that overcomes at least some of the disadvantages stated above.

Another object of the present disclosure is to provide a decoupling system that provides locally limited feedback over the touch surface.

Another object of the present disclosure to provide a decoupling system that provides accurate feedback to multiple input locations over the touch surface independently.

SUMMARY

In one aspect a vehicle includes one or more sensors arranged on at least one of a dashboard, a roof, and a center console of the vehicle, or one or more image capturing devices for capturing one or more images from a left side and a right side of the vehicle, an electronic control unit (ECU) configured to communicate with the one or more sensors or the one or more image capturing devices, and at least one of a morphing surface, a windshield display, and one or more displays configured to be controlled by the ECU.

The vehicle may include the one or more sensors, where the ECU receives data from the one or more sensors on one or more of a position of an occupant, a position of an object, a size of an object, or a shape of an object.

The one or more sensors may be arranged under a black panel surface.

The one or more sensors may include at least one of a Time of Flight (ToF) sensor, a camera, an infrared (IR) sensor, a radar, an ultrasound, a capacitive sensor, a brightness sensor, and a LIDAR sensor.

The one or more sensors may include a plurality of sensors, and a first sensor of the plurality of sensors may be configured to detect a position of the occupant to activate or deactivate a second sensor or a third sensor of the plurality of sensors.

In response to the first sensor detecting that the position of the occupant is outside a range of the second sensor and inside a range of the third sensor, the third sensor may be activated, and in response to the first sensor detecting that the position of the occupant is outside the range of the third sensor and inside the range of the second sensor, the second sensor may be activated.

The second sensor and the third sensor may be positioned on a left side and a right side of an instrument cluster display at a distance ranging from about 15 cm above to about 15 cm below the instrument cluster display.

The one or more sensors may be configured to detect a position of at least one of a center of a face of the occupant, an outer edge of a head of the occupant, a shoulder of the occupant, and a head of the occupant with respect to a shoulder of the occupant.

Each of the one or more sensors may have a field of view of at least about 30 degrees and operates at a close range of at least about 5 cm.

The vehicle may include the windshield display, and content on the windshield display may be configured to be moved depending on the data received from the one or more sensors.

The content on the windshield display may be configured to be moved to compensate for movement of eyes of the occupant with respect to at least one of an icon on the windshield display or an external object outside the vehicle.

The one or more sensors may be configured to detect one or more of an identification, a drowsiness or fatigue, a distraction, a head orientation, an eye gaze, a facial expression, a gender classification, an age classification, a body type, a quantity, a hand gesture, a thumbs up gesture, an open palm gesture, a fist or fist gesture, a grabbing of the object, a releasing of the object, a proximity, and a proximity to the object of or by the occupant.

The one or more sensors may be configured to detect one or more of a type of the object, a size of the object, an orientation of the object, and a position of the object.

The vehicle may further include one or more of an air vent, dashboard lighting, switches, a smartphone, a cup holder, a door pocket, a door armrest, a center console, a trunk, a seat, a seat back, and a roof which is configured to be controlled by the ECU.

The vehicle may include the morphing surface, and the morphing surface may be configured to change shape in response to a signal transmitted from the ECU, and the signal transmitted from the ECU may be initiated using the data received from the one or more sensors.

The morphing surface may include one or more electromechanical actuators which are configured to change the shape of the morphing surface.

The ECU may be configured to initiate a self-test process to determine whether the one or more sensors and the ECU are operating properly.

In response to detecting a malfunction of any of the one or more sensors and the ECU, the ECU may be configured to display the detected malfunction or initialize a programmed malfunction protocol to self-cure the detected malfunction.

In response to no malfunction being detected, the ECU may be configured to read an input of a first sensor of the one or more sensors until an arm movement is detected by the first sensor.

In response to an arm movement being detected by the first sensor, the ECU may be configured to read a second sensor of the one or more sensors to determine whether a recognized movement or gesture is performed, and in response to determining that a recognized movement or gesture is performed, the ECU may be configured to transmit a signal to one or more vehicle components based on the recognized movement or gesture.

The one or more vehicle components may include the morphing surface which is configured to change in shape based on the recognized movement or gesture.

A method of using the vehicle may include initiating a self-test process to determine whether the one or more sensors and the ECU are operating properly, displaying the detected malfunction or initialize a programmed malfunction protocol to self-cure the detected malfunction in response to detecting a malfunction of any of the one or more sensors and the ECU, reading an input of a first sensor of the one or more sensors until an arm movement is detected by the first sensor in response to no malfunction being detected, reading a second sensor of the one or more sensors to determine whether a recognized movement or gesture is performed in response to an arm movement being detected by the first sensor, and transmitting a signal to one or more vehicle components based on the recognized movement or gesture in response to determining that a recognized movement or gesture is performed.

The one or more vehicle components may include a morphing surface, and the method may further include changing a shape of the morphing surface based on the recognized movement or gesture.

The vehicle may include the one or more image capturing devices for capturing one or images from a left side and a right side of the vehicle, and the one or more displays, and the ECU may be configured to control display of the one or more captured images on the one or more displays.

The one or more displays may include one or more of a camera monitoring system (CMS) dedicated displays, a center display, a dashboard display, a door display, and a rear view display.

A left side image captured by the one or more image capturing devices may be configured to be displayed on a first CMS dedicated display, a right side image captured by the one or more image capturing devices may be configured to be displayed on a second CMS dedicated display, and the left side image and the right side image may be configured to be stitched together and displayed on at least one of the center display, the dashboard display, and the door display.

The ECU may be configured to initiate a self-test process to determine whether the one or more displays, the one or more image capturing devices, and the ECU are operating properly.

In response to detecting a malfunction of any of the one or more displays, the one or more image capturing devices, and the ECU, the ECU may be configured to display the detected malfunction or initialize a programmed malfunction protocol to self-cure the detected malfunction, In response to no malfunction being detected, the ECU may be configured to read or receive vehicle data to evaluate driving conditions.

In response to receiving vehicle data, the ECU may be configured to determine whether to use a comfort display or a full display.

In response to determining to use the full display, the ECU may be configured to process the one or more captured images and display the full display on the one or more displays.

In response to determining to use the comfort display, the ECU may be configured to process the one or more captured images and display comfort display on the one or more displays.

The ECU may be configured to determine whether to use the comfort display or the full display using one or more of a vehicle speed, a number of lanes on a road, a current driving lane, a time of driving, a blind spot detection, a vehicle acceleration, and a vehicle brake activation.

The ECU may be configured to determine to use the full display in response to a vehicle speed being less than 6 km/h.

The ECU may be configured to determine to use the comfort display in response to a vehicle speed being greater than or equal to 6 km/h, the vehicle speed may increase or decreases by 10 km/h for a duration of one minute, only one lane being detected, a blind spot warning being off, and a vehicle brake being less than 0.1 g.

The ECU may be configured to determine to use the comfort display in response to a vehicle speed being greater than or equal to 6 km/h and more than one lane being detected.

The ECU may be configured to determine to use the full display in response to a vehicle break being greater than 0.1 g.

The ECU may be configured to determine to use the full display in response to a blind spot warning being on.

The full display may include a separate display of a left side image captured by the one or more image capturing devices and a right side image captured by the one or more image capturing devices, and the comfort display may include a stitched image of the left side image and the right side image on a single one of the one or more displays.

A method of using the vehicle may include initiating a self-test process to determine whether the one or more displays, the one or more image capturing devices, and the ECU are operating properly, displaying the detected malfunction or initialize a programmed malfunction protocol to self-cure the detected malfunction in response to detecting a malfunction of any of the one or more displays, the one or more image capturing devices, and the ECU, reading or receiving vehicle data using the ECU to evaluate driving conditions in response to no malfunction being detected, determining whether to use a comfort display or a full display using the ECU in response to receiving vehicle data, processing the one or more captured images and displaying the full display on the one or more displays in response to determining to use the full display, and processing the one or more captured images and displaying the comfort display on the one or more displays in response to determining to use the comfort display.

The method may further include determining, using the ECU, whether to use the comfort display or the full display using one or more of a vehicle speed, a number of lanes on a road, a current driving lane, a time of driving, a blind spot detection, a vehicle acceleration, and a vehicle brake activation.

The method may further include determining to use the full display in response to a vehicle speed being less than 6 km/h.

The method may further include determining to use the comfort display in response to a vehicle speed being greater than or equal to 6 km/h, the vehicle speed increase or decreases by 10 km/h for a duration of one minute, only one lane being detected, a blind spot warning being off, and a vehicle brake being less than 0.1 g.

The method may further include determining to use the comfort display in response to a vehicle speed being greater than or equal to 6 km/h and more than one lane being detected.

The method may further include determining to use the full display in response to a vehicle break being greater than 0.1 g.

The method may further include determining to use the full display in response to a blind spot warning being on.

The displaying of the full display may include displaying a separate display of a left side image captured by the one or more image capturing devices and a right side image captured by the one or more image capturing devices, and the displaying of the comfort display may include displaying a stitched image of the left side image and the right side image on a single one of the one or more displays.

According to an embodiment a system for decoupling haptic feedback on an internal vehicle component surface comprises: a carrier plate having at least two PCB, wherein each PCB has at least one sensor; the surface configured to receive input from a user, wherein the surface comprises an overlay layer having at least one marking for allowing a user to press the surface at the at least one marking, and wherein the at least one marking is positioned vertically above the at least one sensor; and a compressible layer disposed between the at least two PCB and the overlay layer, wherein the compressible layer is configured to be compressed and transmit the user input to the at least one sensor; wherein each of the at least two PCB is connected to an actuator for providing haptic feedback on receipt of the user input by the at least one sensor, wherein each actuator is configured to provide independent feedback to the user, wherein the compressible layer is configured to transmit the haptic feedback to the surface via compressed region of the compressible layer and absorb the haptic feedback in a non-compressed region of the compressible layer such that the haptic feedback is received by the user in a locally limited portion of the surface.

The configuration of compressible layer between the at least two PCB and the overlay layer provides advantage of absorbing the feedback in non-compressed region of the compressible layer and transmitting the feedback over the compressed region of the compressible layer. In other words, the compressed region may have a higher density than the non-compressed region such that the transmission of the feedback differs. Thus, the feedback is received on a locally limited portion or locally restricted portion and not the entire the surface. Further, due to the configuration of actuators and PCBs, the system is capable of receiving two or more inputs from a user, and in response to each input from the user, independent feedbacks may be provided to the surface, wherein two or more feedbacks do not interfere with each other. Thus, accurate feedbacks are received by the system for multiple user inputs without any confusion to the user.

In accordance with a further embodiment the system comprises at least one illuminating component positioned vertically below the at least one marking. The illuminating component enables the marking to glow, which is useful in finding the location of marking even in dark environment.

In accordance with a further embodiment the at least one marking includes a non-masked translucent layer to light up the input location, or can be a perforated non translucent material. The at least one marking may be made of material having different stiffness from the stiffness of the material of the surface such that a local change in the stiffness may be observed by the user to identify the input location. The configuration of the at least one marking allows the user to identify the input location easily. The at least one marking may be made of conductive material. The advantage of having the at least one marking made of conductive material is that the conductive material helps capacitive detection of the sensor underneath.

In accordance with a further embodiment the system comprises a decoupling material disposed between the at least two PCB and the carrier plate. The decoupling material absorbs vibration caused by the actuator and prevents the vibration to be transmitted to the carrier plate.

In accordance with a further embodiment the at least one sensor is one of a switch/button, a touch sensor, pressure sensor and a capacitive sensor. The at least one sensor is adapted to detect the user's input and transmit it to the at least two PCB.

In accordance with a further embodiment the compressible layer has density ranging from 20 kg/m$^3$ to 90 kg/m$^3$. The density of the compressible layer allows the compressible layer to be compressed when the user presses the surface and absorb the feedback in the non-compressed region of the compressible layer.

In accordance with a further embodiment the compressible layer comprises one of polyvinyl chloride (PVC), polyurethane (PU) thermoplastic polyurethane (TPU), thermoplastic 5 olefin (TPO).

In accordance with a further embodiment the compressible layer is a 3D-mesh structure.

In accordance with an embodiment the internal vehicle component comprises at least one of a door trim, a center console or an instrument panel of the vehicle. The system may be incorporated in the door trim, the center console and the instrument panel of the vehicle. These 10 vehicle components may be used to provide inputs from the user as well as receive feedback from the system to the user. Thus, these vehicle components are more advanced in terms of user interaction with respect to the existing vehicle components.

In accordance with an embodiment the locally limited portion of the surface is the portion of the surface on and around the at least one marking at which the user presses the surface. The system provides feedback on the locally limited portion of the surface and not the entire surface of the vehicle component.

In accordance with a further embodiment the carrier plate is a rigid plate made of Propylene Carbonate (PC), Acrylonitrile Butadiene Styrene (ABS), Polypropylene (PP) or a blend of these materials optionally with or without filler and/or reinforcement such as talc, glass fiber. The carrier plate is made of rigid material such as to provide rigidity to the system and make the system robust.

In accordance with a further embodiment the haptic feedback is transmitted from the actuator to the surface via at least one of the at least two PCB and the compressed region of the compressible layer. When the actuator is actuated to provide feedback, the at least one of the at least two PCB receives the feedback directly from the actuator. The at least one of the at least two PCB then transmits the feedback to the surface via the compressed region of the compressible layer. This enable easy transmission of feedback to the surface.

In accordance with a further embodiment the overlay layer is made of genuine or artificial leather, Polyvinyl chloride (PVC), Thermoplastic polyurethane (TPU) or Thermoplastic olefin (TPO) foil or textile. The material of the overlay layer enables easy transmission of user's input to the at least one of the at least two PCB.

In accordance with a further embodiment the system is configured to receive two inputs from user, wherein the user presses the surface at two markings simultaneously and receive two different localized feedback on the surface independently without interference. The system enables a user to provide two or more inputs and receive feedback for each input. Each feedback is independent from one another and hence the feedbacks do not interfere with one another.

It should be noted that the features set out individually in the following description can be combined with each other in any technically advantageous manner and set out other forms of the present disclosure. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the figures.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 28a illustrates an internal vehicle component according to the present disclosure;

FIG. 28b illustrates an enlarged view of portion "A" of the vehicle internal component of FIG. 28a;

FIG. 29a to 29g illustrates various embodiments of at least one marking;

DETAILED DESCRIPTION

Figure 1:
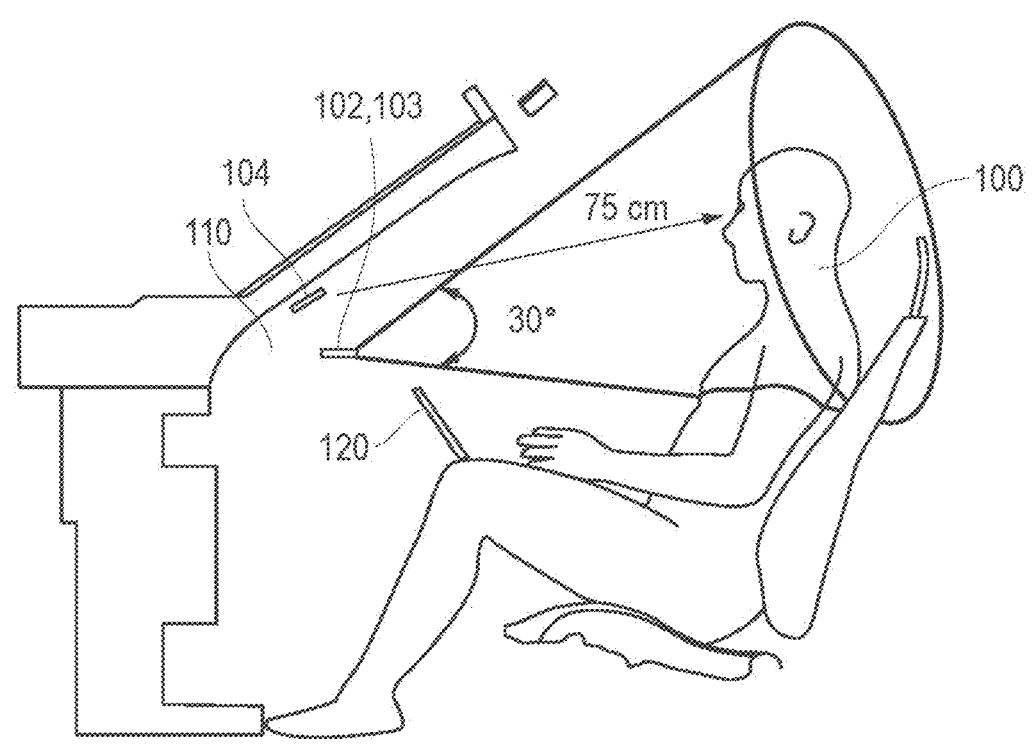
FIG. 1 is a side view of an exemplary arrangement of eye tracking sensors.

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Sensor Arrangements.

Figure 2:
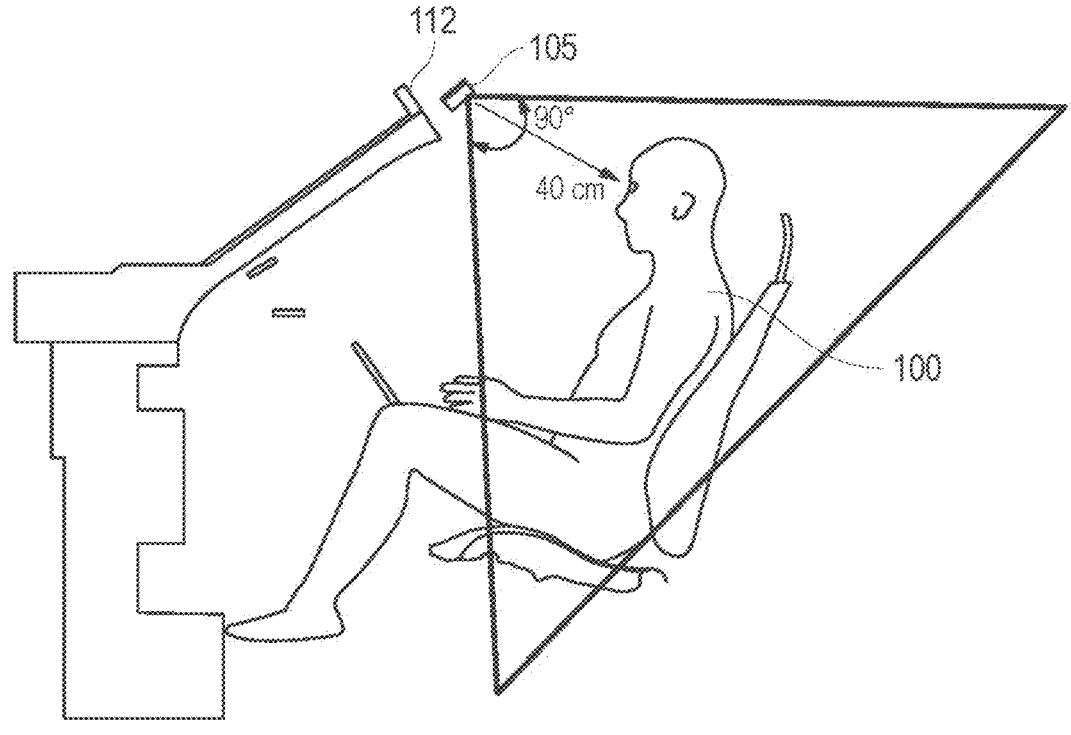
FIG. 2 is a side view of an exemplary arrangement of an upper Time of Flight (ToF) sensor.
Figure 3:
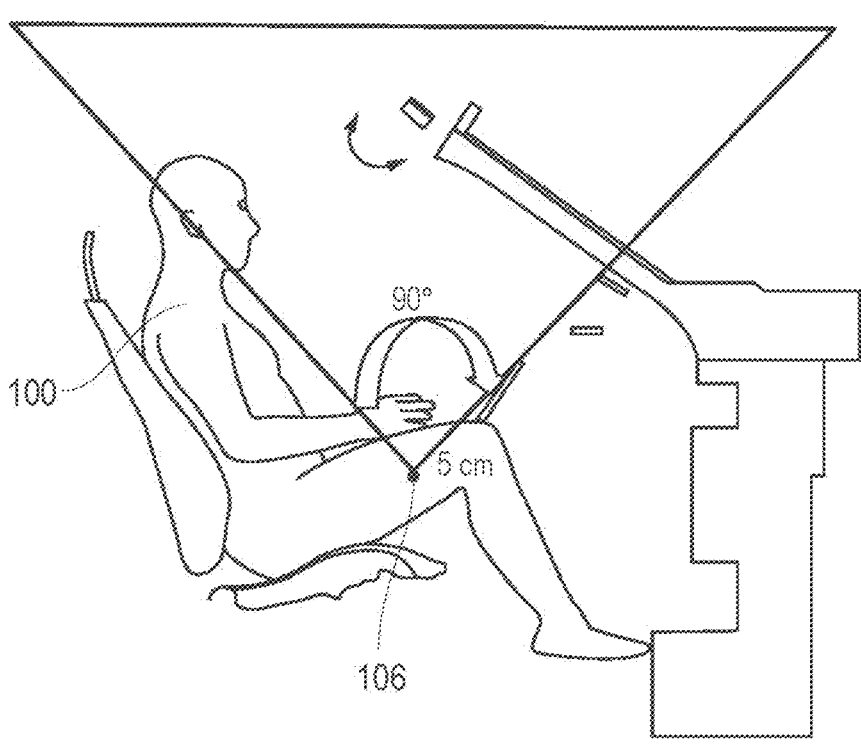
FIG. 3 is a side view of an exemplary arrangement of a center console ToF sensor.

FIGS. 1-3 are side views of an exemplary arrangement of sensors 102, 103, 104. FIG. 1 is a side view of an exemplary arrangement of eye tracking sensors 102, 103, 104.

Three eye tracking sensors 102, 103, 104 are attached to the dashboard 110, each of the sensors 102, 103, 104 may include an IR lamp and a camera. In an example, the sensors 102, 103, 104 are mounted on the dashboard 110 as illustrated in FIG. 1. The distribution is arranged optimally using the field of view (hereinafter "FOV") in order to always recognize the eyes of the driver 100. In this example, each sensor 102, 103, 104 may be arranged under a black panel surface. A further description of the black panel surface is provided below under the heading Uniform Overlay Surface For Sensor And Display. In this example, the entire head of the driver 100 is always detectable. That is, in addition to the eyes, the mouth, nose, ears, eye relief, etc. of the driver 100 should also be detectable. Therefore, in one example, the sensors 102, 103, 104 should be positioned above the steering wheel, on the upper edge of the dashboard 110, or on the front surface of the dashboard 110. While driving, one of the sensors 102, 103, 104 may always be active while the other sensors 102, 103, 104 are deactivated. Activation is determined by which sensor 102, 103, 104 can receive sufficient data about the vehicle occupant 100. Which sensor 102, 103, 104 receives sufficient data about the vehicle occupant 100 is determined by where the occupant 100 looks. By determining the center of the face, another of the sensors 102, 103, 104 which corresponds with the position of the face of the driver 100 is selected and activated.

For example, movement of the center of the face may be detected by a first of the sensors 102, 103, 104 using parameters which indicate whether the center of the face has moved out of the detection range of an active sensor of the sensors 102, 103, 104. A number of different detecting processes may also be used to detect the position of the head and whether the head has moved outside the range of a sensor 102, 103, 104. For example, the outer edge of the head or the axis of the head may be detected/followed. Further, a position of the user's shoulder may be detected/followed, and a position of the head with respect to the shoulders may be followed. Once the position is detected, the other sensor that can detect the face is activated. For example, one of the sensors 102, 103, 104 may be used to detect the position of the user while two of the sensors 102, 103, 104 may be activated or deactivated depending on the detected position of the user in order to detect the user's face. Any one of the sensors 102, 103, 104 may be a time of flight (hereinafter "ToF") sensor or a camera.

In an example, each of the sensors 102, 103, 104 may have a 30° FOV, and with the attachment of two of the sensors 102, 103, 104, a rotation of the head can be detected up to 100° in the horizontal direction. In another example, the FOV of each sensor may be at least 10°, at least 20°, at least 30°, at least 40°, at least 50°, at least 60°, at least 70°, at least 80°, at least 90°, at least 100°, at least 110°, at least 120°, at least 130°, at least 140°, at least 150°, at most 10°, at most 20°, at most 30°, at most 40°, at most 50°, at most 60°, at most 70°, at most 80°, at most 90°, at most 100°, at most 110°, at most 120°, at most 130°, at most 140°, at most 150°, about 10°, about 20°, about 30°, about 40°, about 50°, about 60°, about 70°, about 80°, about 90°, about 100°, about 110°, about 120°, about 130°, about 140°, or about 150°. Additionally, the rotation of the head of the driver 100 may be detected in the horizontal direction at least 20°, at least 30°, at least 40°, at least 50°, at least 60°, at least 70°, at least 80°, at least 90°, at least 100°, at least 110°, at least 120°, at least 130°, at least 140°, at least 150°, at least 160°, at most 20°, at most 30°, at most 40°, at most 50°, at most 60°, at most 70°, at most 80°, at most 90°, at most 100°, at most 110°, at most 120°, at most 130°, at most 140°, at most 150°, at most 160°, about 20°, about 30°, about 40°, about 50°, about 60°, about 70°, about 80°, about 90°, about 100°, about 110°, about 120°, about 130°, about 140°, about 150°, or about 160°. In one example, the distance between the two of the sensors 102, 103, 104 may be approximately 0.5 m. In another example, the distance between the two sensors may be at least 0.1 m, at least 0.2 m, at least 0.3 m, at least 0.4 m, at least 0.5 m, at least 0.6 m, at least 0.7 m, at least 0.8 m, at least 0.9 m, at least 1 m, at most 0.1 m, at most 0.2 m, at most 0.3 m, at most 0.4 m, at most 0.5 m, at most 0.6 m, at most 0.7 m, at most 0.8 m, at most 0.9 m, at most 1 m, about 0.1 m, about 0.2 m, about 0.3 m, about 0.4 m, about 0.5 m, about 0.6 m, about 0.7 m, about 0.8 m, about 0.9 m, or about 1 m. The distance of the occupant 100 to each of the sensors 102, 103, 104 may range and can be up to one meter, the minimum distance differs from person to person, but may be about 10 cm or else the sensor 102, 103, 104 may become saturated.

Still referring to FIG. 1, a model for an eye tracking sensor 102, 103, 104 integration in the cockpit is illustrated. A pair of such sensors 102, 103, 104 may be provided at the left and right of an instrument cluster display 120 at a distance of y=+/−15 cm from the middle of the cluster 120. In further examples, a pair of such sensors 102, 103, 104 may be provided at a distance from the middle of the cluster 120 of at least 5 cm, at least 10 cm, at least 15 cm, at least 20 cm, at least 25 cm, at most 5 cm, at most 10 cm, at most 15 cm, at most 20 cm, at most 25 cm, at most 30 cm, about 5 cm, about 10 cm, about 15 cm, about 20 cm, about 25 cm, and about 30 cm. Each sensor 102, 103, 104 may have a cone opening of about 30°. In another example, the cone opening of each sensor 102, 103, 104 may be at least 10°, at least 20°, at least 30°, at least 40°, at least 50°, at least 60°, at least 70°, at least 80°, at least 90°, at least 100°, at least 110°, at least 120°, at least 130°, at least 140°, at least 150°, at most 10°, at most 20°, at most 30°, at most 40°, at most 50°, at most 60°, at most 70°, at most 80°, at most 90°, at most 100°, at most 110°, at most 120°, at most 130°, at most 140°, at most 150°, about 10°, about 20°, about 30°, about 40°, about 50°, about 60°, about 70°, about 80°, about 90°, about 100°, about 110°, about 120°, about 130°, about 140°, or about 150°. The cones may be directed in a way such that they are capable of always detecting the head of the driver 100 and with no obstructions by the instrument cluster 120 or the steering wheel. By using a pair of sensors 102, 103, 104 arranged accordingly, all sizes of drivers 100 and also all reasonable head movements can be traced. It is estimated that a range of 110° is the movement of the drivers head and body; however, a range of other movements may be detected depending on the range of the sensors 102, 103, 104 used as described throughout this disclosure. As such, the driver 100 can be traced when he looks into exterior mirrors or Camera Monitor System (hereinafter "CMS") displays. The typical distance from the eyes to the sensors may be about 75 cm.

FIG. 2 is a diagram illustrating the arrangement of an upper ToF sensor 105 according to an example of the present disclosure. FIG. 3 is a diagram illustrating the arrangement of a center console ToF sensor 106 according to an example of the present disclosure.

In this example, there is a ToF sensor 105 in the roof console or at the transition between the windscreen and roof 112 on the driver's 100 side for determining the head position of the driver 100. In addition, another ToF sensor 106 may be located in the center console for Human Machine Interface (hereinafter "HMI") or other applications.

The ToF sensor 105 may be used to detect the position of the occupant 100. Mainly the head position is detected, as well as the body. This information may be used to adjust the Head Up Display (hereinafter "HUD") according to the head position since objects displayed in the HUD must be moved according to the head position. For example, if a particular location is to be marked with a symbol in the HUD, the location of the head should be known accurately.

The sensor 106 in the center console may detect gestures and approach and may be used for "swiping" the display contents from the HMI/Display of the Center Console to the Dashboard displays. In addition, when approaching the display, a user 100 may see the position of his or her hand with respect to the display content. The displayed hand can be used to enlarge symbols or fields that may otherwise be missed. The displayed hand combines gesture control with a touch display. According to this example, the display may then be divided into quadrants and the respective quadrant can then be zoomed in or zoomed out.

Still referring to FIG. 2, an example arrangement of the TOF (time-of-flight) sensor 105 in the roof liner 112 is illustrated, and which may be used for head and body tracking. As shown, the sensor 105 may be arranged in a way that the head and upper body for drivers of all sizes can be detected, and the sensor 105 may include margins for smaller users 100 (who may sit closer to the front) and larger users 100. In one example, the sensor 105 has a cone of 90° and operates at a range of about 40 cm. In further examples, the cone opening of the sensor 105 may be at least 20°, at least 30°, at least 40°, at least 50°, at least 60°, at least 70°, at least 80°, at least 90°, at least 100°, at least 110°, at least 120°, at least 130°, at least 140°, at least 150°, at least 160°, at least 170°, at most 20°, at most 30°, at most 40°, at most 50°, at most 60°, at most 70°, at most 80°, at most 90°, at most 100°, at most 110°, at most 120°, at most 130°, at most 140°, at most 150°, at most 160°, at most 170°, about 20°, about 30°, about 40°, about 50°, about 60°, about 70°, about 80°, about 90°, about 100°, about 110°, about 120°, about 130°, about 140°, about 150°, about 160°, or about 170°. The sensor 105 may operate at a range of at least 5 cm, at least 10 cm, at least 15 cm, at least 20 cm, at least 25 cm, at least 30 cm, at least 35 cm, at least 40 cm, at least 45 cm, at least 50 cm, at least 55 cm, at least 60 cm, at least 65 cm, at least 70 cm, at least 75 cm, at least 80 cm, at most 5 cm, at most 10 cm, at most 15 cm, at most 20 cm, at most 25 cm, at most 30 cm, at most 35 cm, at most 40 cm, at most 45 cm, at most 50 cm, at most 55 cm, at most 60 cm, at most 65 cm, at most 70 cm, at most 75 cm, at most 80 cm, about 5 cm, about 10 cm, about 15 cm, about 20 cm, about 25 cm, about 30 cm, about 35 cm, about 40 cm, about 45 cm, about 50 cm, about 55 cm, about 60 cm, about 65 cm, about 70 cm, about 75 cm, or about 80 cm.

Referring to FIG. 3, the arrangement of the TOF (time-of-flight) sensor 106 in the center console is illustrated, and may be used as both a proximity sensor to detect and prepare operating on the touch screen and as a gesture sensor for the operation of the infotainment system (gestures first and palm mainly). As shown, the sensor 106 may be arranged in a way that the hand, both of driver 100 or passenger, can be detected with maximum comfort, and the sensor 106 may include margins for smaller users 100 (sitting closer to the front) and larger users 100 (who typically have longer arms). In one example, the sensor 106 has a cone of 90° and operates at a close range of about 5 cm. In further examples, the cone opening of the sensor 106 may be at least 20°, at least 30°, at least 40°, at least 50°, at least 60°, at least 70°, at least 80°, at least 90°, at least 100°, at least 110°, at least 120°, at least 130°, at least 140°, at least 150°, at least 160°, at least 170°, at most 20°, at most 30°, at most 40°, at most 50°, at most 60°, at most 70°, at most 80°, at most 90°, at most 100°, at most 110°, at most 120°, at most 130°, at most 140°, at most 150°, at most 160°, at most 170°, about 20°, about 30°, about 40°, about 50°, about 60°, about 70°, about 80°, about 90°, about 100°, about 110°, about 120°, about 130°, about 140°, about 150°, about 160°, or about 170°. The sensor 105 may operate at a range of at least 5 cm, at least 10 cm, at least 15 cm, at least 20 cm, at least 25 cm, at least 30 cm, at least 35 cm, at least 40 cm, at least 45 cm, at least 50 cm, at least 55 cm, at least 60 cm, at least 65 cm, at least 70 cm, at least 75 cm, at least 80 cm, at most 5 cm, at most 10 cm, at most 15 cm, at most 20 cm, at most 25 cm, at most 30 cm, at most 35 cm, at most 40 cm, at most 45 cm, at most 50 cm, at most 55 cm, at most 60 cm, at most 65 cm, at most 70 cm, at most 75 cm, at most 80 cm, about 5 cm, about 10 cm, about 15 cm, about 20 cm, about 25 cm, about 30 cm, about 35 cm, about 40 cm, about 45 cm, about 50 cm, about 55 cm, about 60 cm, about 65 cm, about 70 cm, about 75 cm, or about 80 cm.

Further aspects, for example, include moving content on a display, such as a head-up display in particular on windshield, depending on head, eye and/or body position and/or on field of view. Content may be adapted in relation to the vehicle car surroundings by taking at least three positions into account-eyes, the image being displayed, and the actual object.

In an example, to compensate for a relative movement between eyes and image on display and/or actual object, the position of an icon on a display may be adapted. There may be a fixed relationship between the position of the eyes and the display such that the icon moves on the display to follow an object. In another example, the eyes may move relative to the display and the icon may follow this movement, i.e. the icon aligns itself relative to eyes. In a further example, a warning icon moves into the field of view of the eyes due to movement of the vehicle relative to the object.

Other aspects may include attracting the attention of a driver 100 to ensure awareness. In order to attract the attention of a driver 100, a light, a vibration and/or a sound effect may be triggered to alert of a dangerous circumstance. The light effects can be in the field of view of the driver 100, provided by light modules already installed within car like door illumination, dashboard illumination, window illumination, and the like. Vibration can be generated by the seat, the steering wheel or an element in direct contact with the driver 100. The effect may be preselected by the driver 100, or automatically selected based on detected conditions and/or a detected status of the diver 100.

In addition, sensor arrangements may provide additional control features. In an example, selection of a menu function, changing between menus, and other user interface functions may be performed via eye, head and/or body movement detection. In one example, recognizing the identity or condition of a driver 100 results in automatic vehicle configurations such as seat position, steering wheel position, language, address book, favorites, navigation places, limiting of velocity, blocking selected or all function. Recognition may be achieved via pupil identification, face identification, and may including detection of a condition of the driver 100 such as mood, tiredness, and drug or alcohol influence.

The sensors 102, 103, 104, 105, 106 described above in reference to FIGS. 1-3 may have a number of different functions and applications. Some of the functions and application are described in Table 1 below, as an example of the functions which each or all of the sensors 102, 103, 104, 105, 106 and sensor arrangements may perform or applications for which they are used. These functions and applications are only an example, and the present disclosure is not limited to these functions and applications. In Table 1, the ++ symbol indicates that the sensor 102, 103, 104, 105, 106 is the most preferred sensor 102, 103, 104, 105, 106 for performing the example function, the + symbol indicates that the sensor 102, 103, 104, 105, 106 is a preferred sensor 102, 103, 104, 105, 106 for performing the example function, the o symbol indicates that the sensor 102, 103, 104, 105, 106 is a neutral sensor 102, 103, 104, 105, 106 for performing the example function, and the –symbol indicates that the sensor 102, 103, 104, 105, 106 is a less preferred sensor 102, 103, 104, 105, 106 for performing the example function.

TABLE 1

Example Relevance of Sensor Arrangements

| Example function | Sensors 102, 103, 104 illustrated in FIG. 1 | Sensor 105 illustrated in FIG. 2 | Sensor 106 illustrated in FIG. 3 |
| --- | --- | --- | --- |
| Occupant Monitoring | + | ++ | – |
| Driver identification | | | |
| Drowsiness & Fatigue detection | | | |
| Distraction detection | | | |
| Head orientation | | | |
| Eye gaze tracking | | | |

TABLE 1-continued

Example Relevance of Sensor Arrangements

| Example function | Sensors 102, 103, 104 illustrated in FIG. 1 | Sensor 105 illustrated in FIG. 2 | Sensor 106 illustrated in FIG. 3 |
| --- | --- | --- | --- |
| Facial expression & analysis | | | |
| Number of occupants | | | |
| Occupant classification (gender, age, body type, etc.) | | | |
| Gesture Recognition | – | o | ++ |
| Hand gesture of driver and passenger (left-, right hand) | | | |
| Gestures | | | |
| thumb up | | | |
| open palm | | | |
| fist | | | |
| fist action | | | |
| grabbing of object | | | |
| releasing of object | | | |
| proximity to an object | | | |
| proximity to a sensor | | | |
| Object Recognition/Classification | o | + | ++ |
| Type of object: Bottle, smart phone, spectacles, keys | | | |
| Classification of object: size, orientation, position | | | |

Figure 19:
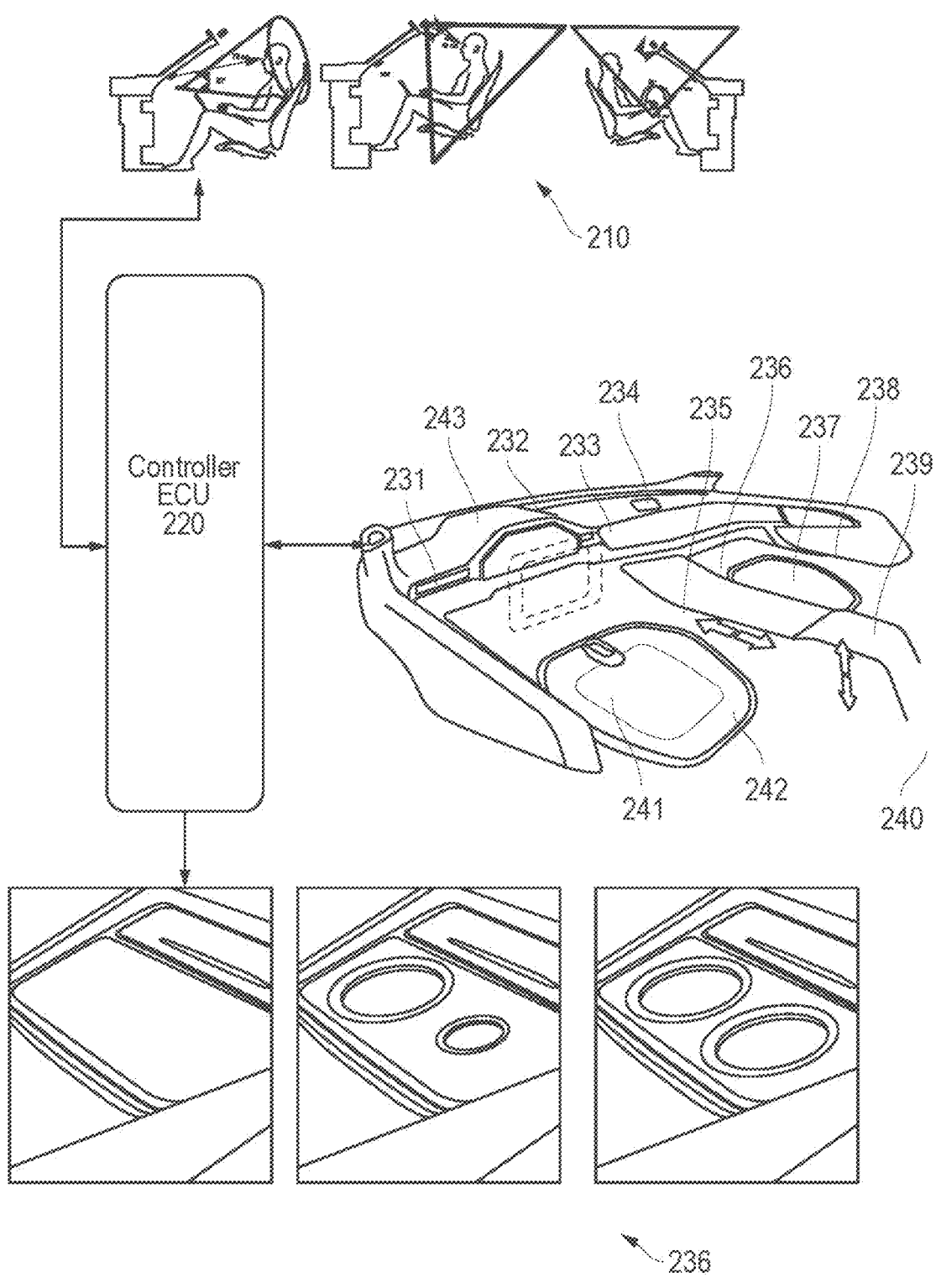
FIG. 19 is a diagram illustrating an exemplary system that can monitor or detect user movements or the environment for controlling a number of vehicle components and conditions.

FIG. 19 is a diagram illustrating an exemplary system 200 that can monitor or detect user movements or the environment for controlling a number of vehicle components and conditions.

Referring to FIG. 19, the system 200 includes one or more sensor arrangements 210 which can be the same or similar to the sensor arrangements and sensors 102, 103, 104, 105, 106 described in reference to FIGS. 1-3. The system 200 further includes an interior controller or electronic control unit (ECU) 220 in communication with the sensor arrangements 210 and one or more vehicle components. The ECU 220 may be configured to control each of the one or more vehicle components. The vehicle components may include, for example, an air vent 231, dashboard lighting 232, switches 233, a smartphone 234, a cup holder 235, a morphing surface 236, a door pocket 237, a door armrest 238, a center console 239, a trunk 240, a seat 241, a seat back 242, and a roof 243. Each of these components may move in response to one or more programed motions or environments being detected. As a result, a system 200 is provided that can monitor all kind of movements and especially movement of objects in the interior of the vehicle. For example, the system 200 may anticipate and trace movement of objects in the vehicle interior, such as bottles, cups, keys, glasses, phones, and smart phones. To achieve these functions, the system may include one or more electro-mechanical actuators, an arrangement of sensors 210, control by the ECU 220, and the software/algorithms for programming the ECU 220.

Materials, actuators, and structures used for forming a morphing surface such as morphing surface 236 are known to a person of ordinary skill in the art, for example, as described in U.S. Pat. No. 7,858,891 B2 and U.S. Pat. No. 10,173,615 B2.

Figure 20:
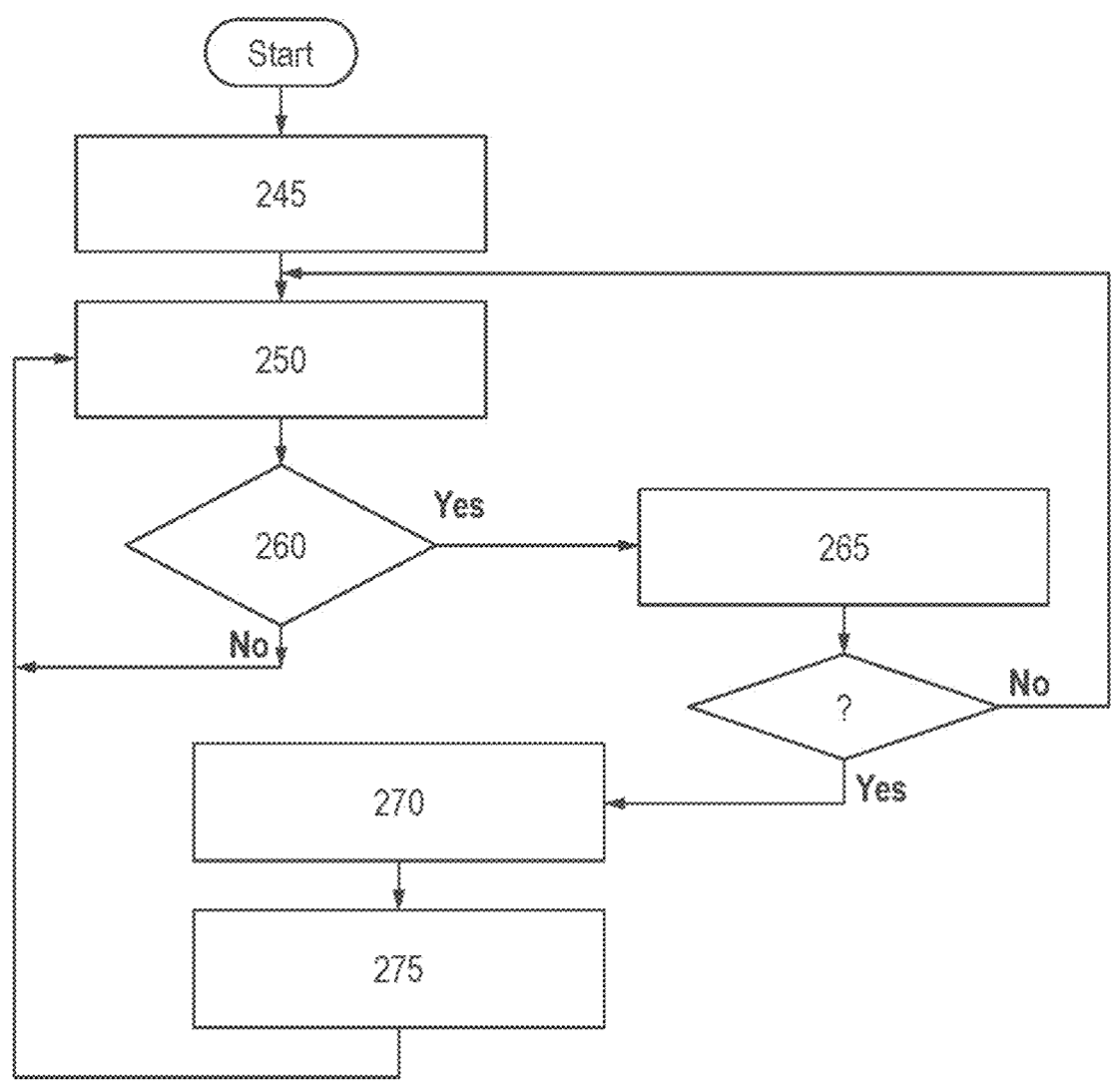
FIG. 20 is a flow chart illustrating an exemplary process of controlling a morphing surface using the one or more sensor arrangements and electronic control unit.

FIG. 20 is a flow chart illustrating an exemplary process of controlling a morphing surface 236 using a system 200 with one or more sensor arrangements 210 and an ECU 220.

Referring to the example illustrated in FIG. 20, the process may be initiated at first step 245 after a start step in which the system 200 initiates a self-test to determine whether the sensors 102, 103, 104, 105, 106, ECU 220, and all components are operating properly. At step 245, if any malfunctions are detected, the system 200 may indicate the detected malfunctions to the user 100 or may initialize a programmed malfunction protocol to self-cure the one or more detected defects. In this example, the next step 250 after the self-test is to read the input of TOF sensor 105 in the roof 112 of the vehicle, as described in reference to FIG. 2. In step 260, the sensor may detect whether an arm movement is made, and the ECU 220 may continue to read the TOF sensor 105 if no arm movement is detected. In response to an arm movement being detected, in step 265, the ECU 220 may read one or more of the other sensors 102, 103, 104, 106 to determine whether a recognized gesture or movement is made. If no recognized gesture or movement is determined to be made, the ECU 220 may restart the detection process by returning back to step 250. If a gesture or movement is recognized, the object and direction affiliated with the gesture and movement may be determined in step 270. Once the object and direction are determined in step 270, an accompanying actuation in response to the determined object and direction may be calculated in step 275, and the ECU 220 may send a signal to one or more of the vehicle components 232, 233, 234, 235, 236, 237, 238, 239, 240, 241, 242, 243, such as the morphing surface 236, for initiating the actuation mechanism.

One practical example of the above process being implemented may be for controlling the morphing surface 236 to accommodate a bottle of a driver 100. In this example, a driver 100 may grab a bottle out of his pocket or bag, and the TOF sensor 105 may detect arm movement. The ECU 220 may determine that the bottle does not approach the cup holder, and detect the bottle in the driver's hand. The one or more sensors 102, 103, 104, 105, 106 may estimate the size of the bottle for classification purposes. If the driver 100 opens the bottle cap, the one or more sensors 102, 103, 104, 105, 106 may monitor the movement of the hand and arm of the driver 100, and the ECU 220 may determine that this movement is not relevant for an actuation mechanism to be initiated. However, the classification of the bottle may change from closed bottle to open bottle. If the driver 100 drinks from the bottle, the ECU 220 may again determine that this is not relevant for an actuation mechanism. If the driver 100 closes the bottle and moves the bottle towards the cup holder, the one or more sensors 102, 103, 104, 105, 106 may detect the movement, and the ECU 220 may determine the movement is a relevant movement and calculate the position of the movement. The ECU 220 may calculate the expected position on the morphing surface 236 and the size of the bottle, and actuate the forming of a hole in the morphing surface 236 based on the calculated expected position and the size of the bottle. The sensors 102, 103, 104, 105, 106 may detect placement of the bottle—at which point movement has stopped, and the ECU 220 may initiate a command to lock the bottle and send the command to the morphing surface 236 actuators. At this point, the driver 100 may release his or her grip on the bottle, and the sensors 102, 103, 104, 105, 106 may detect the released hand. The ECU 220 may store the position and classification of the bottle including the consumed volume and type of drink, and may forward this information to an Internet of Things (IoT) environment.

The above described example is only one practical example of the process illustrated in FIG. 20. Other examples may involve objects other than a bottle such as car keys, home keys, glasses, smart phones, among other objects. Each of these objects may also be registered, their whereabouts may be visible remotely in the IoT environment, and their position may be used to improve the performance of other devices. For example, with smart phones, the exact position as determined may be used to improve the performance of wireless charging devices.

Uniform Overlay Surface for Sensor and Display.

Figure 4:
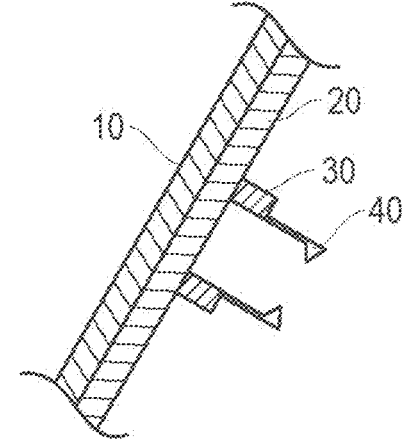
FIG. 4 is a cross-sectional view of an exemplary fastening structure.

FIG. 4 is a cross-sectional view of an exemplary fastening structure. Referring to FIG. 4, a seamless surface of a dashboard includes a structure of a partially translucent layer 10, which is designed as a decorative cover layer, and a second carrier layer 20. The partially translucent layer 10 and the second carrier layer 20 may be produced using multi-component injection molding.

The topcoat may be decorated by various coating methods such as varnishing, PVD, IML IMD, PUR flooding, and others. In addition, paints, which do not serve for appearance, but are applied for environmental influences such as resistance to scratching or imprints applied. A self-healing coating can also be applied. Another example includes an anti-reflective surface to avoid unwanted reflections.

Still referring to FIG. 4, the carrier layer may have recesses 30 in certain areas. These recesses 30 may be used to position sensors and/or displays. For this purpose, fastening devices 40 may be present. In this example, these fastening devices 40 are designed as clips but they are not limited thereto. The fasteners 40 may be attached to the support layer 20 so that no bumps on the top layer arise and thus the high-quality appearance is not disturbed.

Sensors which can be installed include but are not limited to ToF sensors, cameras, IR sensors, radar, ultrasound, capacitive sensors, brightness sensors, LIDAR sensors, among others.

In a further example, a plurality of frameless displays can be mounted. These displays may be technically and operationally linked with one another via software so that they can appear as a single, wide screen when viewed from the outside.

Integration of Holographic Displays in Bionic Structure or Dashboard.

Figure 5A:
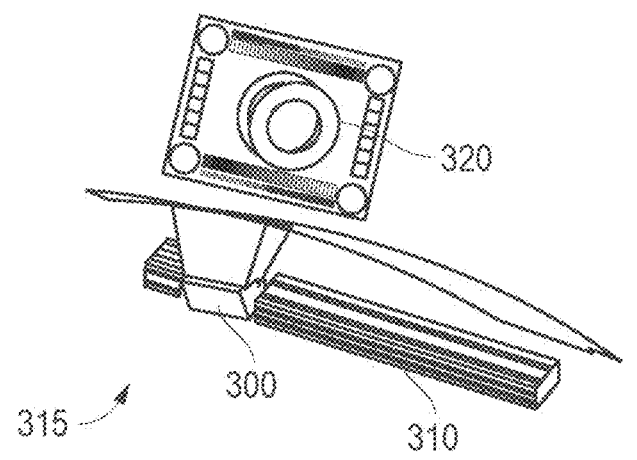
FIGS. 5A and 5B are front perspective views of an exemplary display device and seamless dashboard.
Figure 5B:
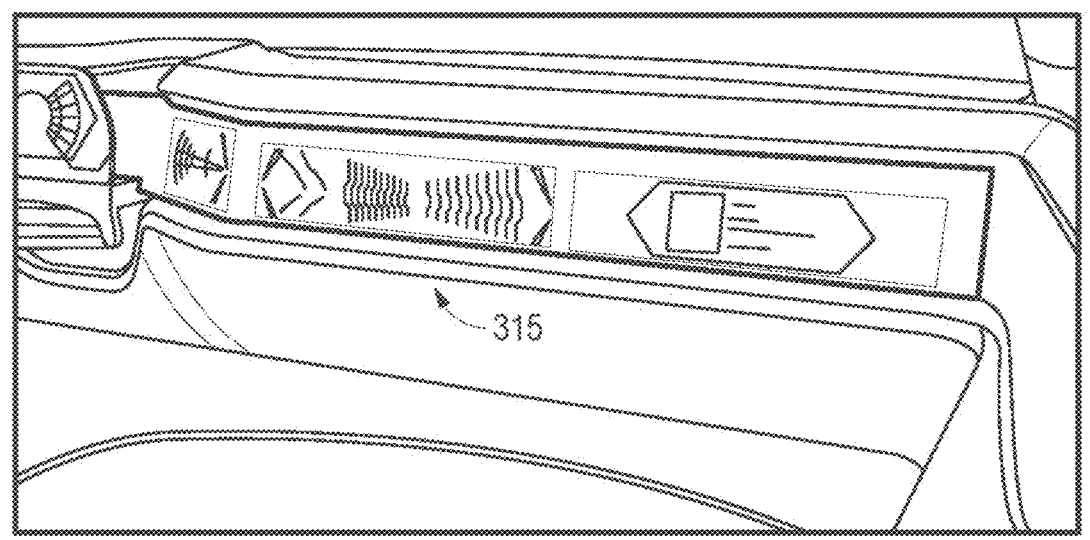

FIGS. 5A and 5B are front perspective views of a display device and a seamless dashboard.

The recent trend in automotive displays has been the use of Heads-Up Display that allow the projection of information in front of the driver and align the projected images and objects to reality. The projected media can be a combined screen, the car windshield or a hologram that is projected in front of the car. In all these examples, a calibration for the display device is typically needed so that the alignment can be done precisely. It is easy to do this alignment with precise measuring equipment during research and development but not in mass production.

A calibration method is described below that includes steps that can be performed in mass production. For example, these steps can be performed on an assembly line such as an assembly line of the module supplier (tier 1) of the dashboard integrating the display device, or the a car assembly line where all the components including the display device, the windscreen, the car body and the dashboard are joined. The disclosed method may, for example, be used to anticipate the tolerances from the car body, the dashboard, the windscreen mounting, and to provide means to measure and compensate the deviations in an efficient way.

Referring to FIG. 5A, an outer frame for the display device 300 is illustrated. The outer frame may be fixed to the dashboard 310 and thus to the car body which contains 1 to 6 gears 315 (mechanically or electrically driven) that can compensate in the x/y/z direction and angularly for Yaw/

Pitch/Roll. The display 300 within its frame may be pre-assembled into the dashboard 310 (e.g. at the module supplier) and then lifted into the car body and fixed (e.g. by a robot). The car body may then be fixed on a test stand and the display pointed towards a test pattern. Either human operator or test camera may measure the alignment of the projected object and a correction value may be calculated to apply to the above mentioned gears. Either a manual operator or an automated drive may move the gears 315 until the best alignment is given. Then the gear 315 may be blocked with a locking device. An alignment of the image compared with a test chart may be displayed as shown in 320 for calculating the correction values and gear rotation. Referring to FIG. 5B, a front perspective view of an exemplary seamless dashboard 315 is illustrated.

Full Windshield Head Up Display.

Figure 6:
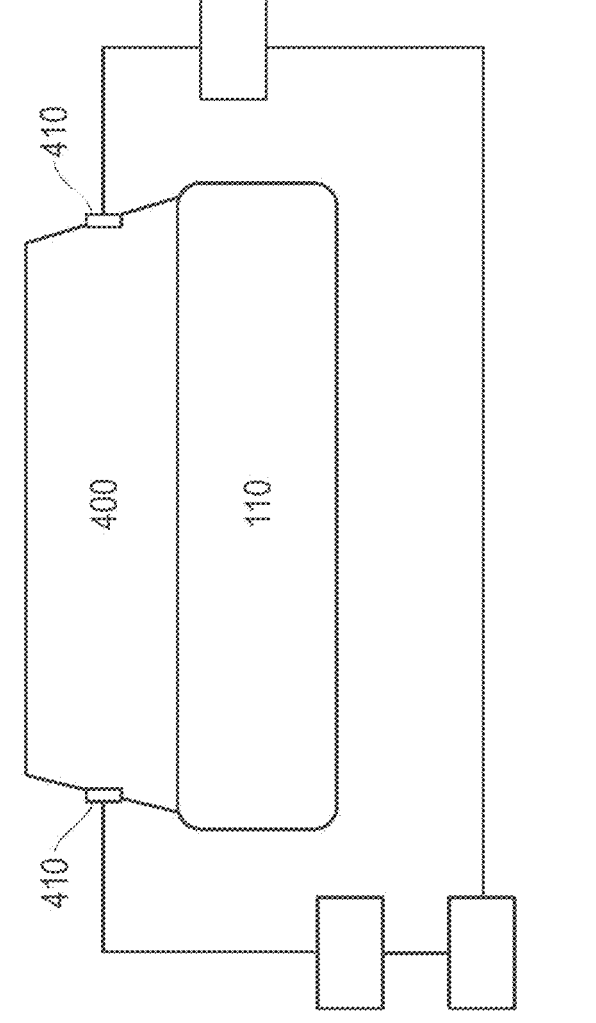
FIG. 6 is a diagram illustrating an exemplary Head Up Display (HUD) projector.
Figure 7:
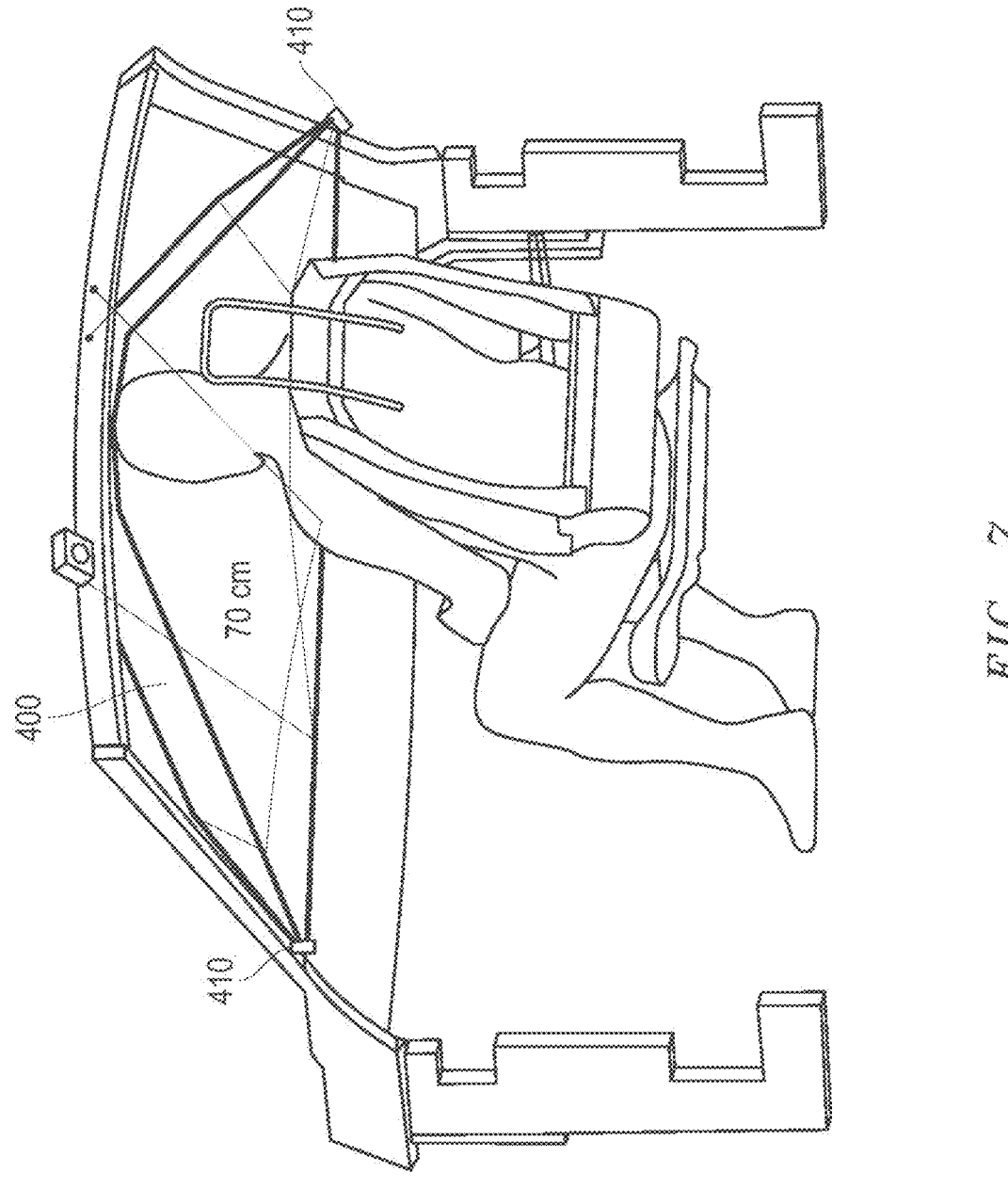
FIG. 7 is a rear perspective view of an exemplary projector model of pico projectors.
Figure 8:
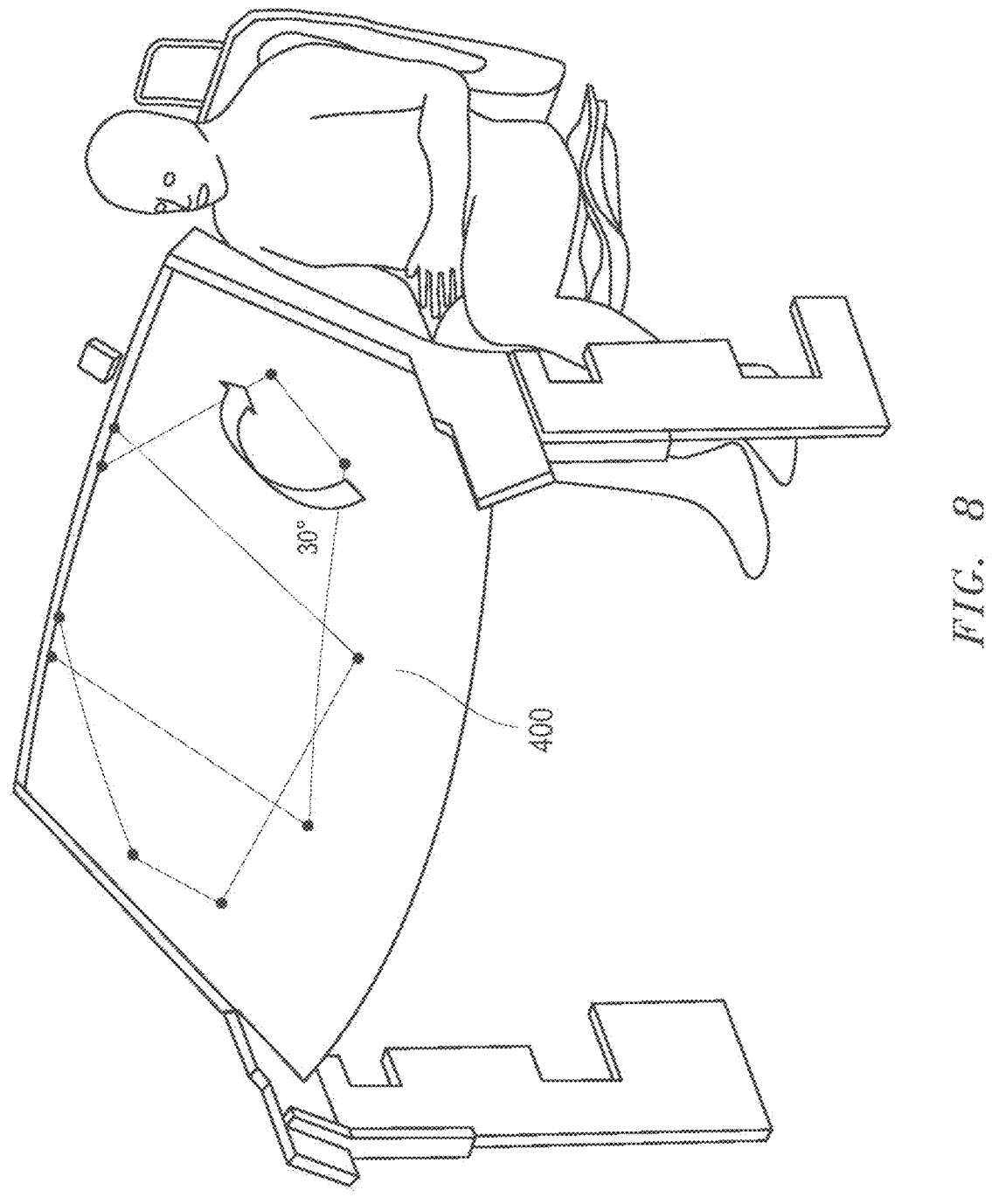
FIG. 8 is a front perspective view of an exemplary projector model of pico projectors.

FIG. 6 is a diagram illustrating an exemplary HUD projector 410. FIG. 7 is a rear perspective view of an exemplary projector model of pico projectors 410. FIG. 8 is a front perspective view of an exemplary projector model of pico projectors 410.

Referring to FIGS. 6-8, instead of one large display being mirrored in the windshield 400, at least two simple projectors 410 may be used to project images anywhere on the windshield 400. The projection of two projectors 410 may be processed to provide one rectified projection on the windshield 400. Keystone corrections may be performed.

The windshield 400 may be provided with a foil to enhance image quality, either applied on the inside or between two glasses. The foil may be arranged so that it can reflect specific wavelengths. The foil may be placed on the windshield 400 by gluing or by adhesion, and can also be placed between the windshield 400 to substitute the typically used foil, which is used for safety aspects.

In an example, advertisements may be displayed on the windshield 400 when the car is not driving. Pedestrians or other road users may also be able to see the advertisements on the display which is used as a screen.

In one example, the brightness is the maximum allowed brightness allowed by the projector 410. Luminance may be laser class 1 and the minimal contrast to achieve may be 1:5000 for the projector 410. The brightness of the projector 410 may be 0.01 mW. Luminance may be 100 Candela.

Sharpness as the windshield 400 is curved may need to be taken into consideration. In typical prior applications, stitching has not been implemented. In this example, if there are a pair of projectors 410, stitching in the middle of the two pictures may be applied. The advantage is to provide a bigger area for projection. With that, a seamless presentation of the display with uniform luminance may be achieved. A single calibration may be done for installing the system where the projectors 410 are aligned with the shape of the windshield 400.

Figure 9:
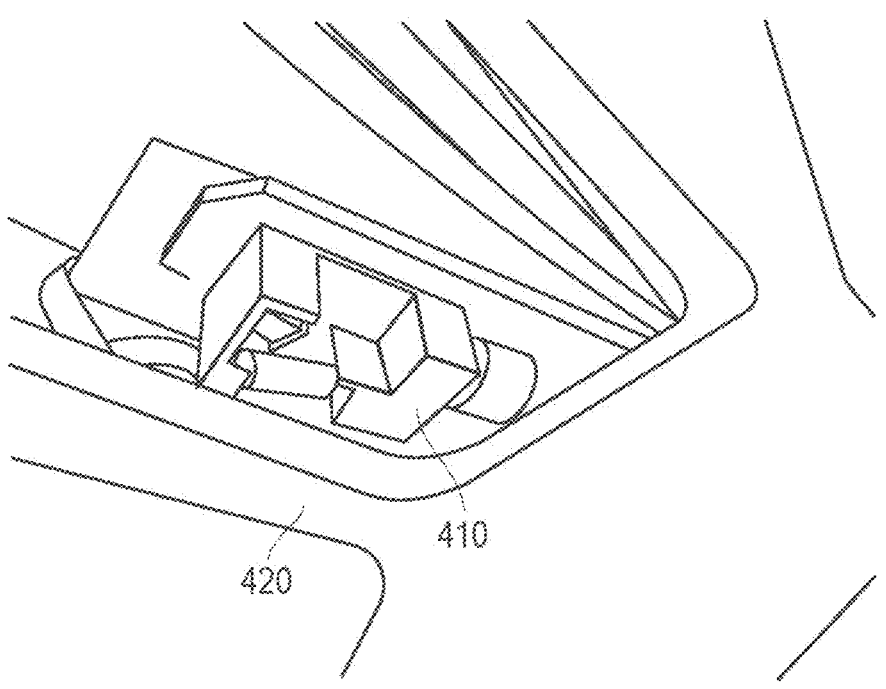
FIG. 9 is a front perspective view of an exemplary attachment of a pico projector in or at an A-pillar.

FIG. 9 is a front perspective view of an exemplary attachment of a pico projector 410 in or at an A-pillar 420.

Referring to FIG. 9, the position of the projector 410 is in/at the A-pillar 420. The projector 410 as such is adjustable, to adjust the picture. To adjust the projectors 410, a user may also use actuators and a calibration system. The mechanical attachment as such is not defined. There can also be a service flap or a similar structure integrated in the A-Pillar 420 to re-adjust or exchange parts. This flap may also act as a decorative trim part that is translucent and has a nice appearance. The flap can protrude out of the A-pillar 420 cover. In one example, the flap is optically clear so that there is no loss in brightness. In another example, there is an open space where the projector 410 is located. The projectors 410 may be mounted so that they don't collide or interfere with safety installations, like airbags or pre-crash applications. In an example, a cone may extend from the lens in the direction of the laser being applied to the windshield 400, and the projector 410 may be embedded within the A-pillar 420. The cone may close the gap or opening formed in the A-pillar 420. For example, a number of different cones may be used. The cone may be a flexible cone that can be moved to close the hole in the direction of the lasers. In one example, the distance from the lens of the projector 410 to the windshield 420 may vary from 1 mm to 150 mm. The projector may be attached to the A-pillar 420, to the body of the car, or to another structural feature or carrier which is attached to the body of the car.

Transparent Dashboard with Integrated Light Guide.

In recent trends in the automotive industry, more and more product parts of the vehicle dashboard are made of plastic. At the same time, more lighting systems and light guides are used in the interior of the car. Also, new developments allow the possibility of making plastic parts using advanced technologies such as bionic structures, 3D-printing, etc. . . . However, separate lighting units/light guides are still used and attached to the main structure for lighting.

Figure 21:
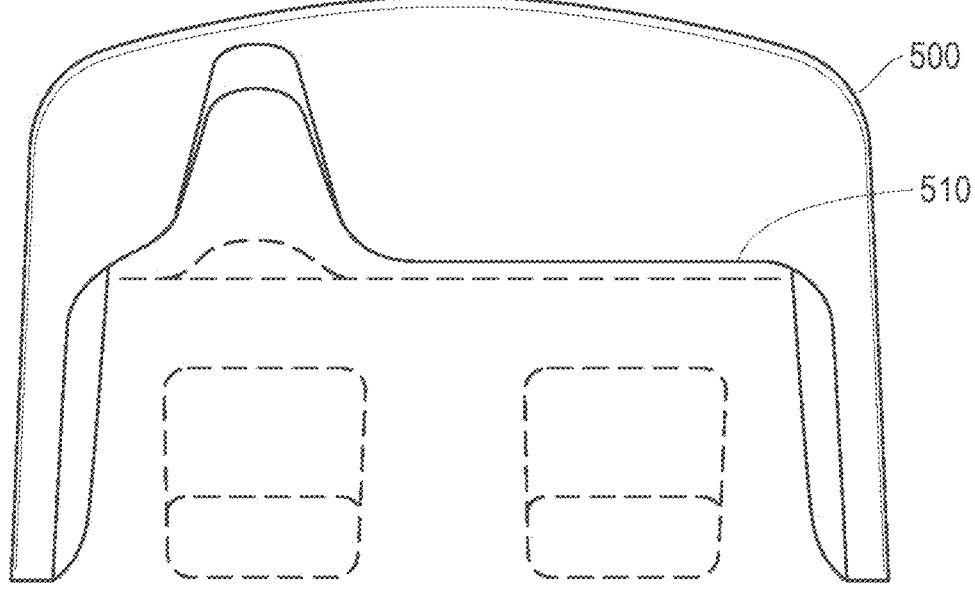
FIG. 21 is a top plan view of an exemplary light guide on a vehicle dashboard.

FIG. 21 is a top perspective view of an exemplary light guide 500 and manufacturing methods thereof. According to an example, the lighting devices and light guides 500 may become a part of the dashboard plastic structure 510. In other words, the lighting devices and light guides 500 may be molded or printed with transparent (clear or colored) material and used as light guides 500. The injection of light may work the same way as in the case of separate light guides 500. The emission of the light can be modulated, if necessary, with screen printing methods.

Moving Touch Pad to Follow Passenger Position.

As autonomous vehicles become more prevalent, vehicle drivers and passengers may desire to select and change positions more freely. As the focus of the driver on the pure driver function can be relaxed, the strict requirements for passive safety (airbags, seat belts) can also be partly relaxed and replaced by better active safety. Self-driving vehicles according to SAE Levels 3 and 4 may allow drivers to recline to a more relaxed position (for level 3), similar to Aircraft seats, and potentially to a totally reclining position (for level 4). As a result, the established ergonomics and operation of car systems such as infotainment, car settings, climate control and others may no longer be accessible or work properly. Inaccessibility of the car systems result in the driver/passenger not being able to easily reach the controls which are usually mounted in the dashboard or the center console of a conventional car.

Accordingly, an exemplary autonomous driving vehicle may include a movable center console and a touch pad mounted on the center console at an adaptable angle. The center console may have several degrees of freedom (e.g. movable in the x-direction and the z-direction, and rotatable about the z-axis). The touch pad may be tuned around several axes (for example, the y-axis and the z-axis). As such, the touch pad may be properly seen and reached by the driver/passenger in at least 3 positions: normal driving position, relaxed driving position, and sleeping/lying position. Sensors in the car and in the car drive train can determine the status of car and driver, and based on the determined status, the sensors may send signals directing a change in the position to a maximum comfort level.

Display Cooling with Ventilation Elements.

As cars continue to have more and more additional monitors in a dashboard, climate management for the electronic components of the displays is already becoming a problem. Climate management is more and more important as the number of displays increases because the overheating of displays may also affect the vehicle occupants' climate.

Modifications to air conditioner openings, and the elimination of heat accumulation are described. In an example, a ventilation system includes an air duct system positioned within the dashboard, which receives its air from the current air conditioning system before the air duct system passes through a directional distributor at the interior of the vehicle. For this purpose, a defined opening is directed into a designated channel structure and guided close to the back of the monitor. Here, the air warms and thus the air can continue to pull up/back. Therefore, this arrangement allows the cooling systems to be positioned below the monitors so that the air is led up past the monitors. The air supply in front of the distributor should not be switched off. The locking mechanisms, for example via actuators, may lie between the distributor system and lamellae exit. Accordingly, a ventilation system with an air-channel structure inside is provided.

Figure 10:
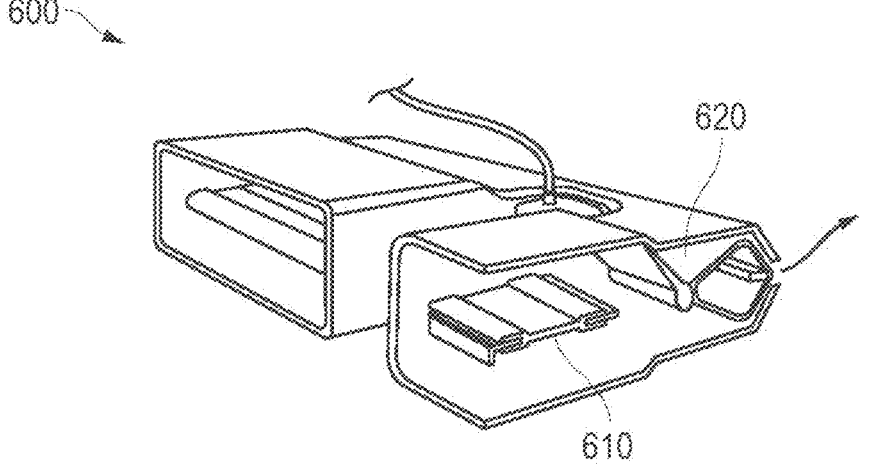
FIG. 10 is a perspective view of an exemplary cooling system.

FIG. 10 is a perspective view of an exemplary cooling system 600. Referring to FIG. 10, an exemplary image of a cooling system 600 with a view of the shutter 610 and lamella 620 is illustrated. Here, the air is disconnected, and passed through air ducts, which can blow the air on the back walls of the monitors.

Figure 11:
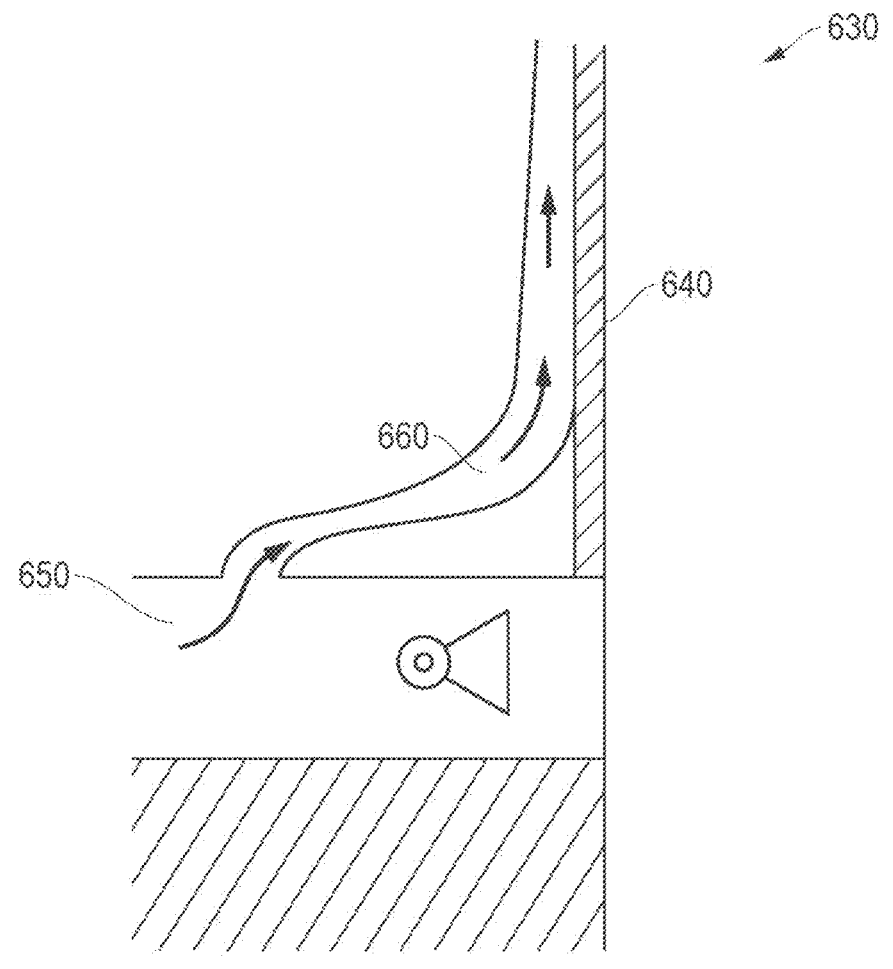
FIG. 11 is a diagram illustrating an exemplary air guiding system.
Figure 12:
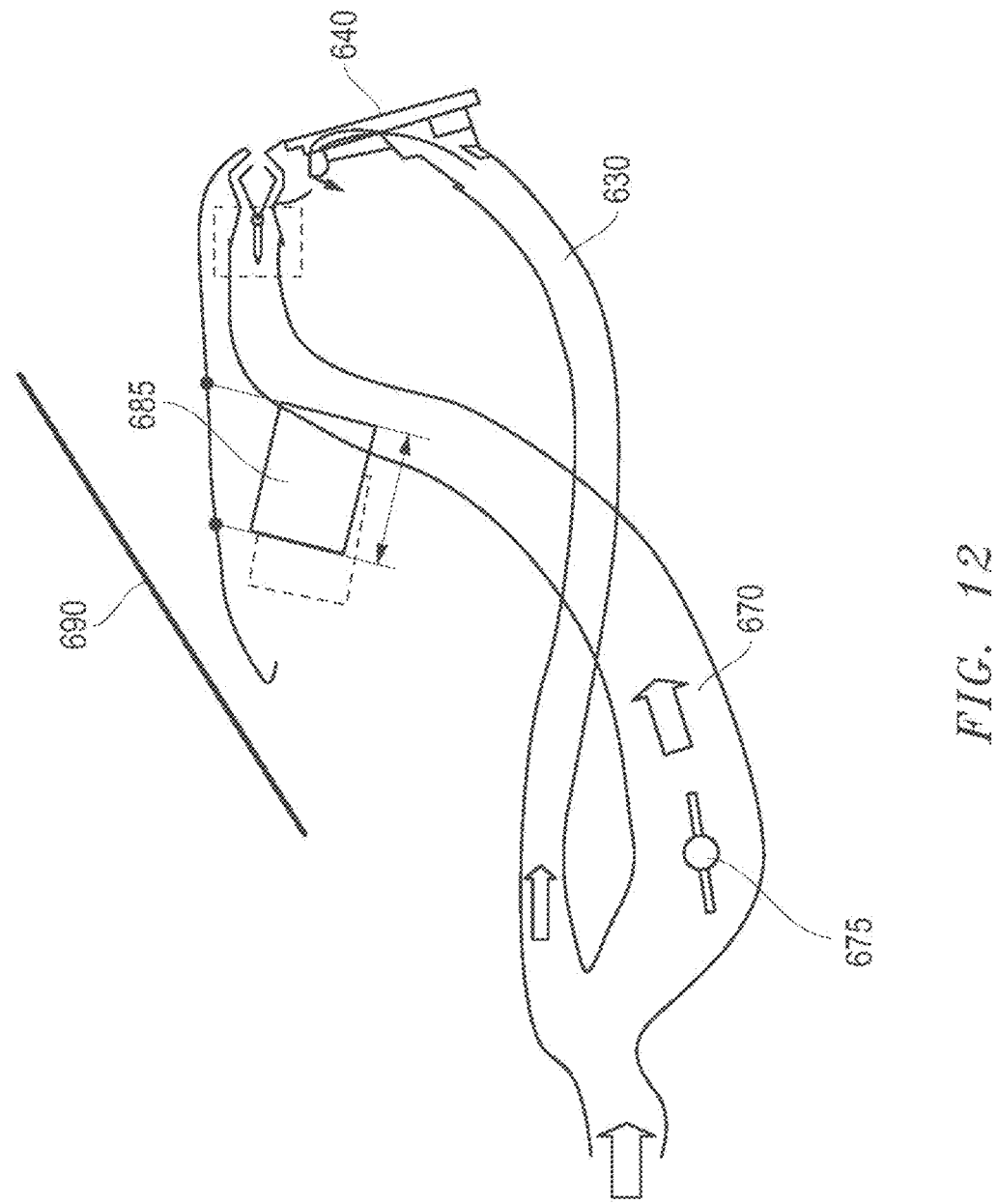
FIG. 12 is a diagram illustrating an example of air flowing towards the display and to the vent.

FIG. 11 is a diagram illustrating an exemplary air guiding system 630. Referring to FIG. 11, the air is guided through an air vent 650 and into an air duct 660 past the rear walls of the monitor 640, and executed before the closure. FIG. 12 is a diagram illustrating an example of air flowing towards the monitor 640 and to the vent. Referring to FIG. 12, a plan view is illustrated of how to cool several monitors 640 in parallel with air channels including an outlet channel 670 and cooling channel 680, in parallel. The vehicle airbag 685 and windshield 690 are illustrated. A shutter fold 675 is disposed in the outlet channel 670.

Touchskin Keys.

Figure 13:
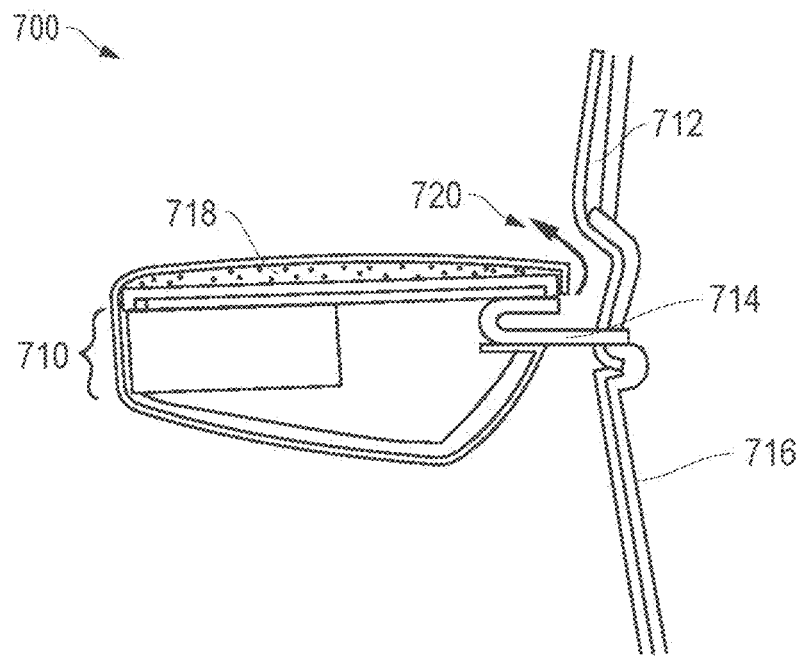
FIG. 13 is a side cross-sectional view of an exemplary armrest section.
Figure 14:
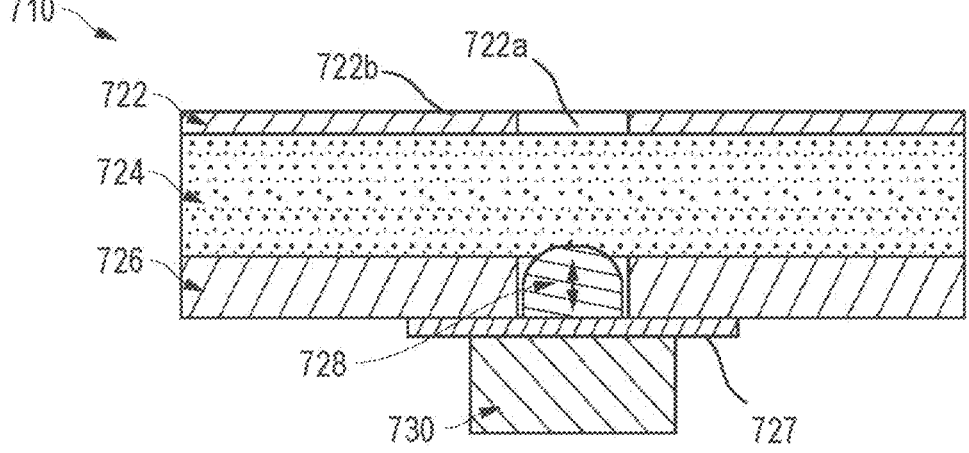
FIG. 14 is a cross-sectional view of an exemplary basic structure of a touchskin configuration.
Figure 15:
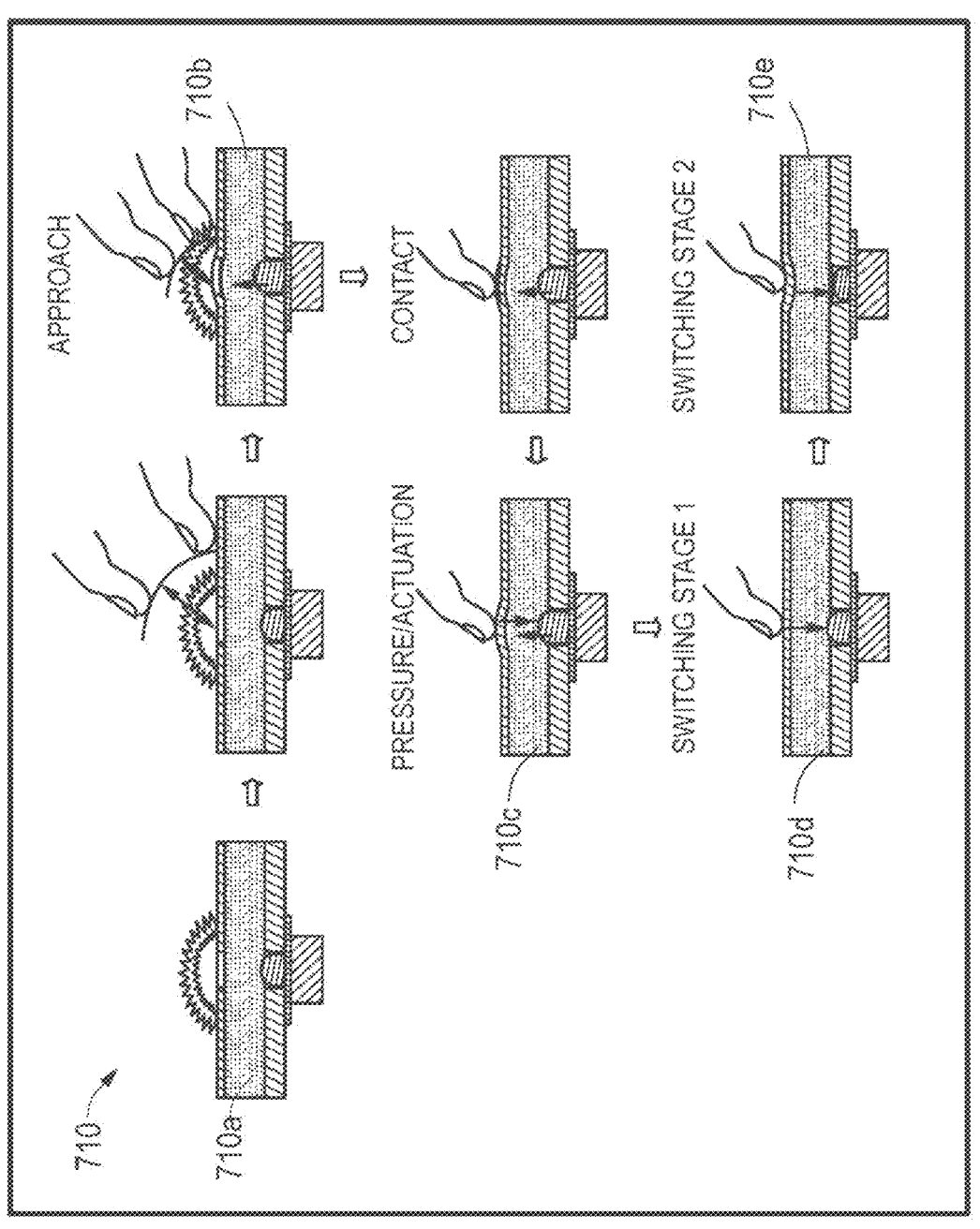
FIG. 15 is a flow chart illustrating an exemplary operable surface at different stages.
Figure 16:
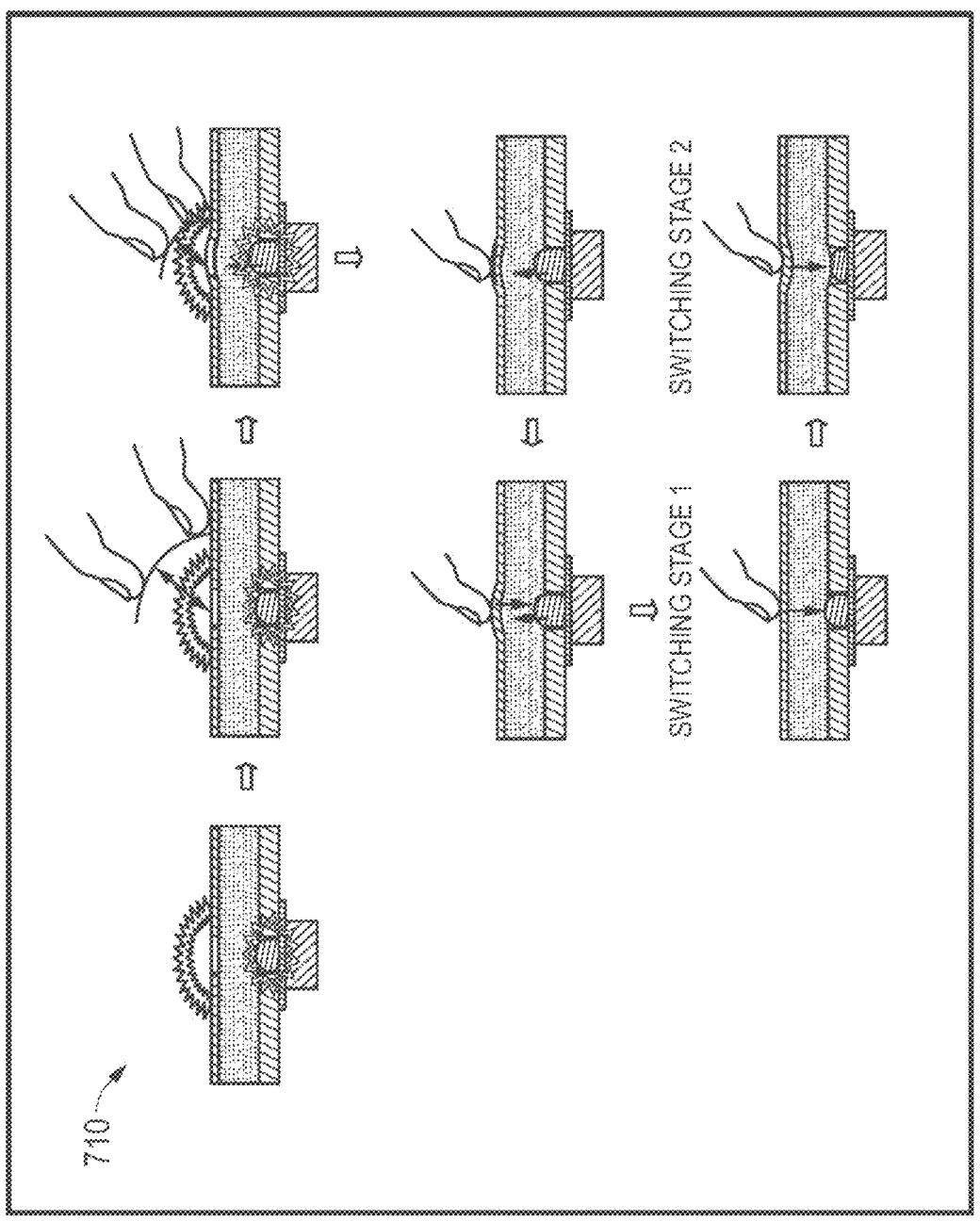
FIG. 16 is a flow chart illustrating another exemplary operable surface at different stages.

FIG. 13 is a side cross-sectional view of an exemplary armrest section 700. FIG. 14 is a cross-sectional view of an exemplary basic structure of a touchskin configuration 710. FIG. 15 is a flow chart illustrating an exemplary operable surface at different stages. FIG. 16 is a flow chart illustrating another exemplary operable surface at different stages.

Referring to FIGS. 13-16, rather than having a pressure bar directly visible in a vehicle, a pressure bar according to the illustrated example may be integrated laterally in the armrest 700 and covered with leather. The key functions are known in response to the operator touching the surface as in the displayed flow charts, because information about each key function may appear on a display. Furthermore, in certain examples, a preset bar combining both capacitive sensor and push button may be provided. As a result, push buttons may be replaced with piezo actuators, creating haptic feedback without movement. In embodiments, a touchskin configuration 710 may be provided using one or more components of the systems and methods for decoupling haptic feedback on an internal vehicle component surface, as described below with reference to FIGS. 29-33.

As illustrated in FIG. 13, the armrest 700 includes a touchskin configuration 710. The light guide 712, air channel 714, and door trim carrier 716 are illustrated with respect to the armrest 700. On the surface of the touchskin configuration 710, screen-printed heating 718 is provided with side air flow 720.

As illustrated in FIG. 14, the touchskin configuration 710 includes a decorative skin 722, a soft component which may be foam 724, a carrier 726, a push button 728, and a morphing sensor 730. As shown in FIG. 14, the decorative skin 722 may include two portions, a first portion 722a that is substantially located above the push button 728 and a second portion 722b that surrounds the first portion 722a. In embodiments, the first portion 722a of the decorative skin 722 may include a print, marking or other characteristic to distinguish the area above the button 728. For example, in one embodiment, the first portion 722a may have a different texture than the second portion 722b of the decorative skin 722 so that the area above the push button 728 may be distinguished by touch. In certain embodiments, the first portion 722a of the decorative skin 722 may be made of a different material than the second portion 722b. For instance, the first portion 722a of the decorative skin 722 may be made of a flexible and/or shape-memory material that is resistant to being stretched out of shape by multiple button cycles. In other embodiments, the first portion 722a of the decorative skin 722 may be made of a light-transmissive material that lights up or glows to distinguish the area above the push button 728, for example by illuminating a light within the push button 728 as shown in FIG. 16.

The morphing sensor 730 shown in FIG. 14 may include a proximity sensor that is used to activate the push button 728 when approached by a user's finger, for example as shown in the examples illustrated in FIGS. 15 and 16. In embodiments, the first portion 722a of the decorative skin 722 and/or the foam layer 724 may be made of materials that are selected so as to not substantially interfere with the operation of the proximity sensor. In another embodiment, the touchskin configuration 710 may include one or more separate activation button that is used to activate the push button 728.

Figure 30:
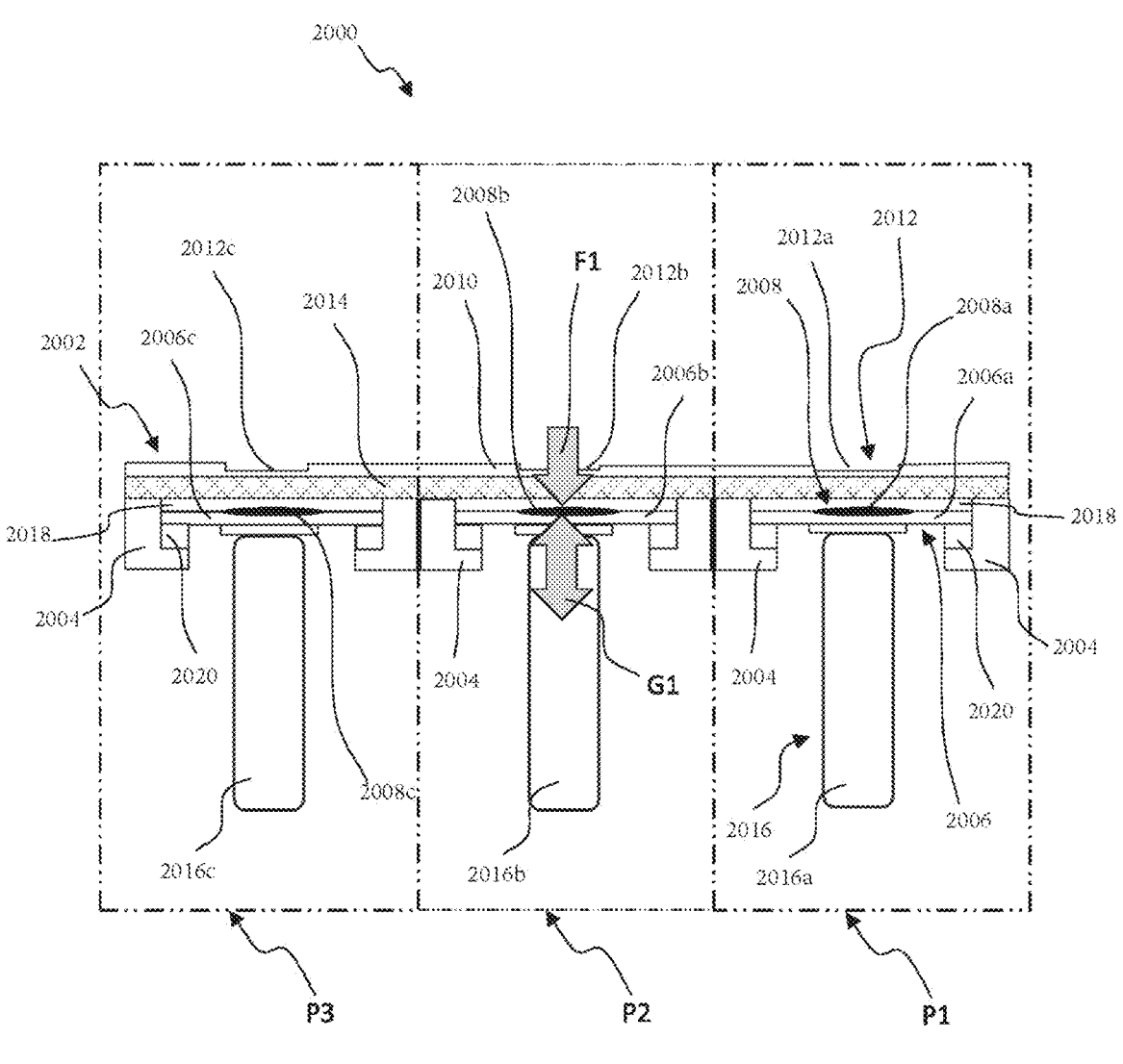
FIG. 30 illustrates a cross sectional view of a system for decoupling haptic feedback on the internal vehicle component surface according to the present disclosure.
Figure 31:
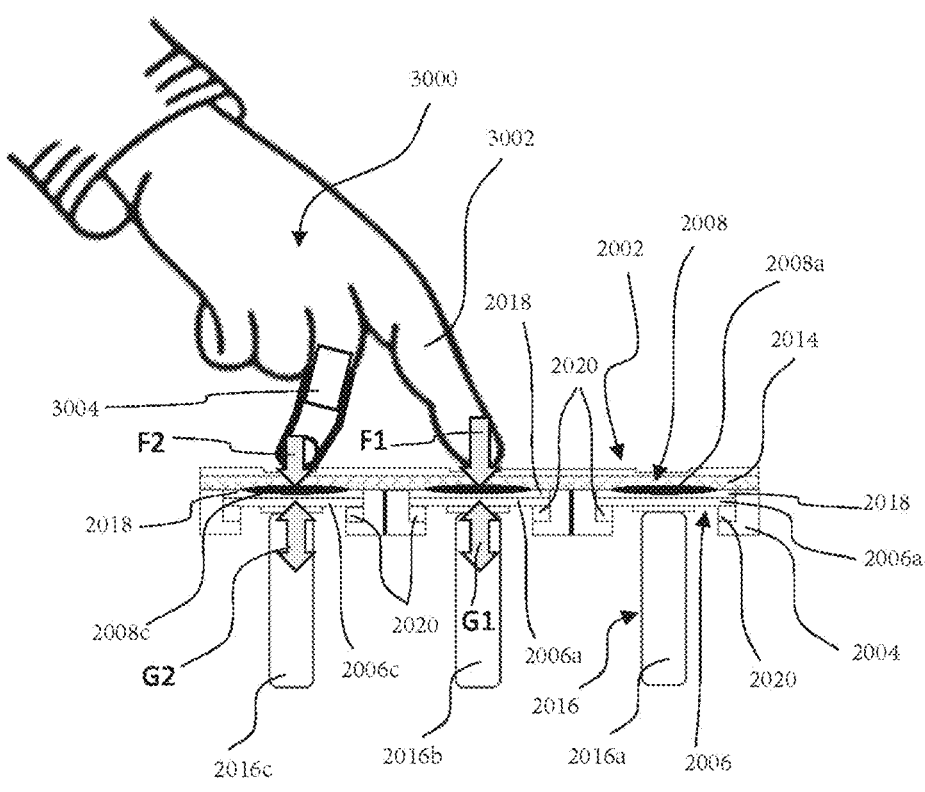
FIG. 31 illustrates a cross sectional view of the system for decoupling haptic feedback on the internal vehicle component surface of FIG. 30 showing user's input according to the present disclosure.

In embodiments, push-button 728 may be part of a push-button assembly that includes a push-button switch and a vertical movement mechanism that causes the push-button switch to rise, as shown for example in FIGS. 15 and 16. In certain examples, the push-button switch 728 may be caused to rise using an actuator (for example as shown in FIGS. 30 and 31) that is used move the push-button switch 728 up and down and/or to provide haptic feedback. The vertical movement mechanism may, for example, include a moveable pin or rod coupled to the push-button switch 728 that may be activated by the morphing sensor 730 to cause push-button switch 728 to rise through an opening in the carrier layer 726.

A first example operation of the touchskin configuration 710 is shown by the flow diagram depicted in FIG. 15. As shown at 710a, a proximity detector signal may emanate from the first portion 722a of the decorative skin 722, for example from a proximity detector included in the morphing sensor 730. When the proximity detector senses something approaching, such as the user's finger, the morphing sensor 730 activates the push button 728, for example causing the button to rise (e.g., pop-up) as shown at 710b. In other embodiments, the touchskin configuration 710 may further include an ECU or controller to that is used to activate the push button 728 based on a signal from the morphing sensor 730. As shown, activation of the pop-up button at 710b may also cause the first portion 722a of the decorative skin 722 to rise, resulting in a visible button-like area on the surface of the decorative skin 722. The push-button 728 may then be actuated by pressing on the raised surface of the decorative skin 722, as shown at 710c. In embodiments, the push-button 728 may have multiple switching stages, for example as shown at 710*d* and 710*e*. For instance, a first switching state may occur by depressing the raised surface of the decorative skin 722 by a first amount (as shown at 710*d*), and a second switching state may occur by depressing the raised surface by a further amount (as shown at 710*e*).

A second example operation of the touchskin configuration 710 is shown by the flow diagram depicted in FIG. 16. This example is the same as the example shown in FIG. 15, except that the push-button further includes a light-emitting device, such as an LED, that emits light through the first portion 722*a* of the decorative 722 skin in order to visibly identify the area above the button. As shown in the illustrated example, the push-button may emit light until it has been pressed by a user. In other embodiments, activation of the push-button by the proximity sensor may cause the push-button to begin emitting light.

Figure 22:
FIG. 22 is a perspective view of an exemplary vehicle door including touchskin keys.
Figure 23:
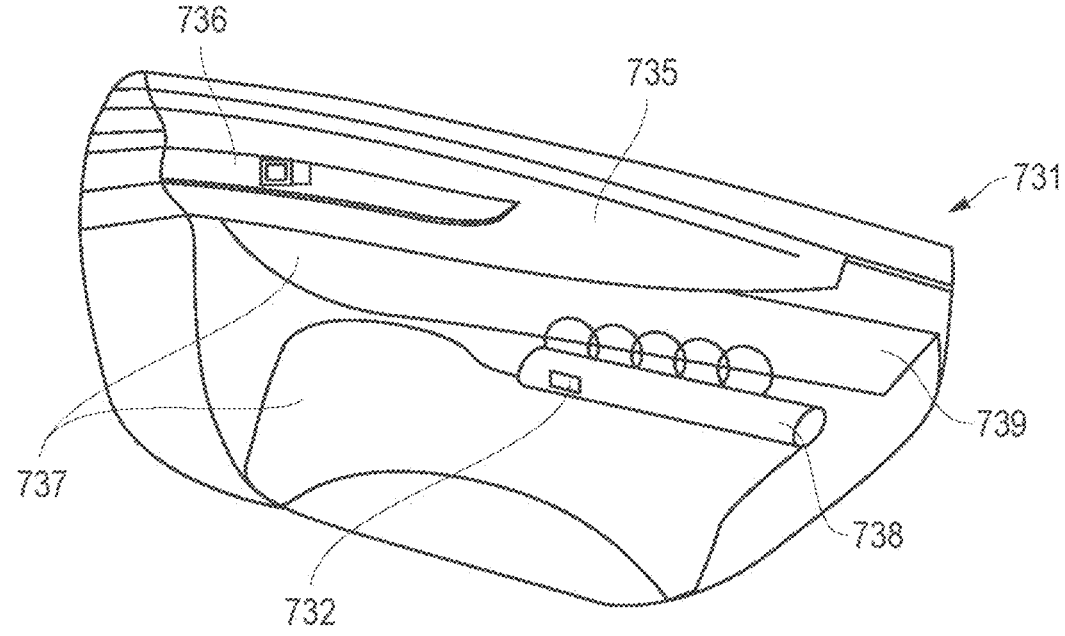
FIG. 23 is a perspective view of an exemplary vehicle door including smart surfaces.

FIGS. 22 and 23 are perspective views of an exemplary vehicle door 731 including touchskin keys 732.

Referring to FIGS. 22 and 23, the touchskin keys 732 may be hidden or slightly visible in plain sight by a user. The keys 732 may be covered by a leather, a polyurethane, or other elastic material 734. The keys 732 may be arranged in a number of different configurations. According to the example below, eight keys 732 are arranged with four keys 732 in two rows. Each key 732 may perform a different function when selected, and each key 732 may perform more the same function or more than one function depending on whether it is touched or pressed down. As per the magnified image below, the keys 732 may be slightly visible in plain sight. The keys 732 may be lit up at all times or may be unlit. The keys 732 may only light up when a user approaches the key 732 or when a user touches a key 732. In this example, the keys 732 are arranged at the side of the armrest, as illustrated. The keys 732 may also be arranged in other positions at the door or dashboard.

Referring to FIG. 23, the vehicle door 731 may include one or more smart materials. The locations and uses described in reference to FIG. 23 are provided only as an example. The vehicle door 731 may include a display 736 for displaying door settings, a lighting 735 for function activation or deactivation, a touchskin keys 732 configuration, a diffuse side air venting 739, a printed surface heating 738, color change surfaces 737 depending on ambient lighting or air temperature, and a capacitive surface 739 for changing light color, among other functions.
See Through Vehicle Display.

Figure 17:
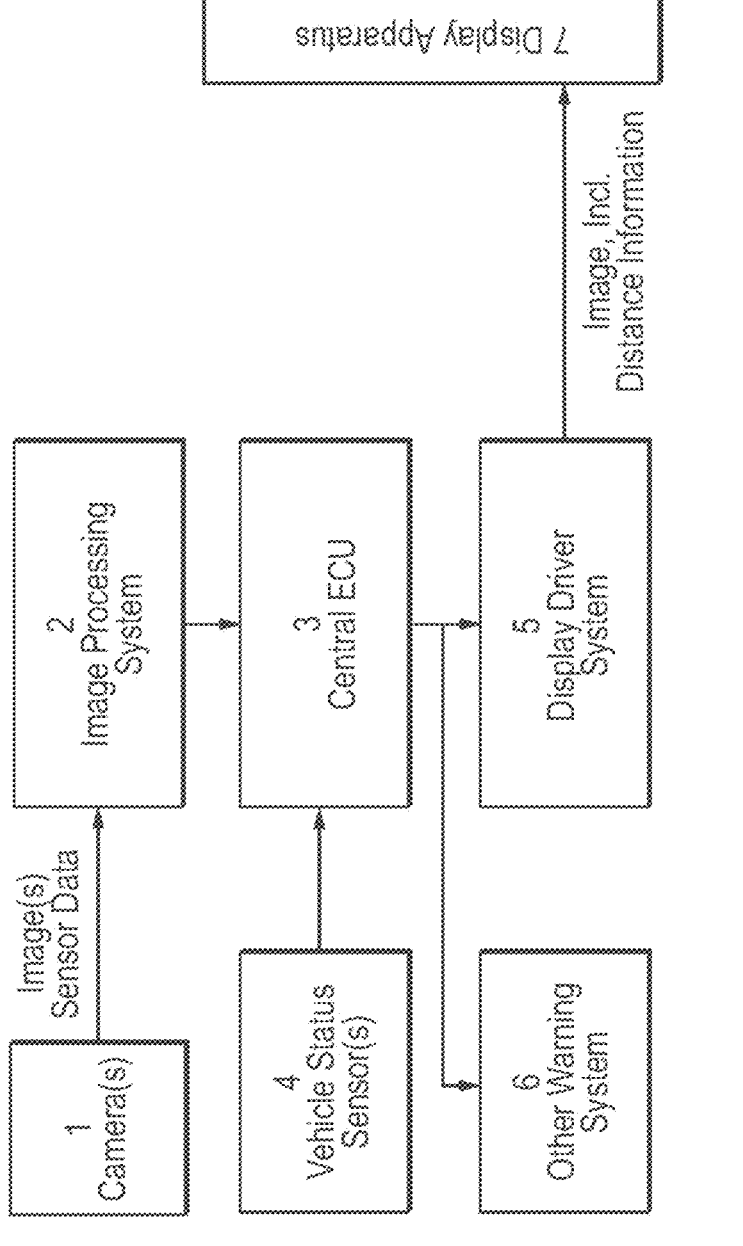
FIG. 17 is a block diagram illustrating an exemplary see through display for parking purposes.

FIG. 17 is a block diagram illustrating an exemplary system for a see-through display for parking purposes. During parking situations and low speed maneuvers, the driver may take several personal precautions to obtain spatial awareness especially for the rear and front view; however, spatial awareness assist for side view may be unavailable. Unavailability of spatial awareness assist may results in scratching of the rim, wheel, and body of the vehicle due to invisible objects which may be hidden to the driver's sight and behind the door.

Referring to FIG. 17, a vehicle may be provided with one or more camera sensors on both sides thereof (for example, placed in the same pod of a CMS, camera with wide viewing angle face down). The one or more sensors may capture image information on both sides of the vehicle and process such information. For example, the sensor may give information on the distance between body/tire to outside objects. The display on the door may give intuitive input to the driver regarding vehicle spatial information.

Figure 24:
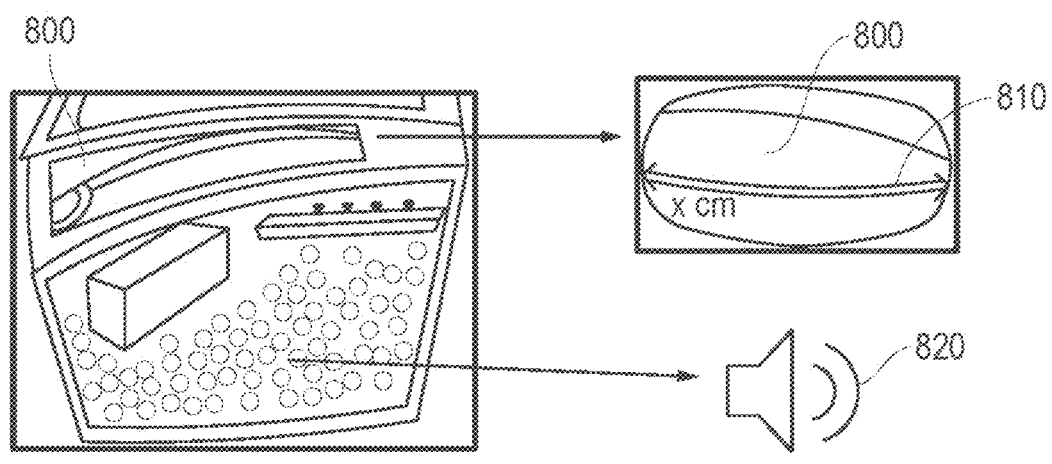
FIG. 24 is a perspective view of an exemplary see-through display and display features.
Figure 25:
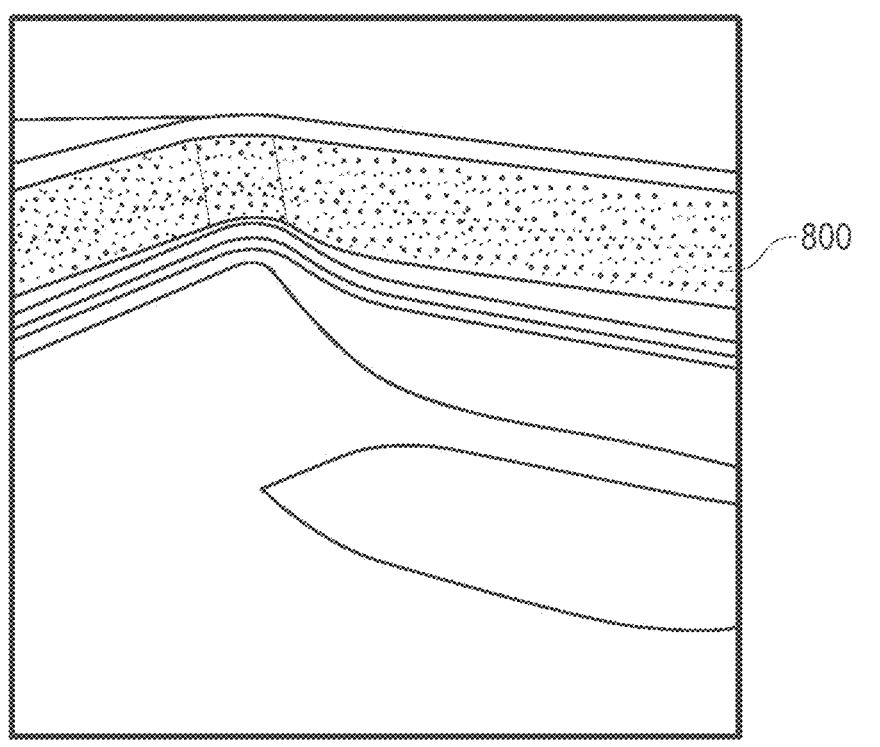
FIG. 25 is a perspective view of an exemplary see-through display in a vehicle door.

FIGS. 24 and 25 are perspective views of an exemplary see-through display 800. Referring to FIGS. 24 and 25, the camera sensor may be positioned on both sides of the car at the doors. A display 800 may act as a see-through display 800 which displays what would be seen on the other side of the vehicle, as though the display 800 were a clear window or opening. That is, a camera may capture the image on the other side of the vehicle and display that image to the user as though he were looking through a clear window when looking at the display 800. In an example, the display 800 may be positioned at the door as illustrated in FIG. 24. In another example, the camera may be positioned at the front of the vehicle with the see-through display 800 being on the front dashboard so that a user may see through the front of the car where it is usually blocked by the dashboard.

The display 800 may illustrate a number of different values or warnings. For example, the display 800 may give visual information 810 on distance to surrounding objects. The display 800 may provide warning such as sounds 820 or flashing lights when an object is within a threshold distance. The display 800 may provide different warnings sounds 820 or lights depending on a size or type of the object detected. The display 800 may provide different warning sounds 820 or lights depending on whether the object is moving or not moving, and whether approaching the vehicle or moving away from the vehicle. In an example, the see-through display 800 may blend in with the interior of the vehicle and not operate the see-through function until it is activated by a user. In another example, the see-through function is automatically operated when the vehicle is in a specific mode such as a parking mode, or when the car is in reverse.

It should be appreciated that the see-through display 800 significantly enhances the driver experience by allowing a user to see a position which is typically impossible to see. For example, in a larger vehicles such as pickup trucks, the position that a door occupies is very large and would not allow a user to see a short object or person such as a child standing beside the door as compared to a vehicle which is low to the ground and provides a significantly larger view to the side of the vehicle. In addition, such see-through systems may significantly ease compliance with regulations of certain countries, such as Japan, where vehicles are required to be able to view pilots of certain heights besides the vehicle in order to pass compliance. While the see-through display 800 is described in reference to autonomous vehicles, it should be appreciated that this feature, as well as all features of this disclosure, are also described in reference to non-autonomous vehicles and this disclosure covers all vehicles
Dashboard with Rearranged Camera Monitoring Systems.

Figure 18:
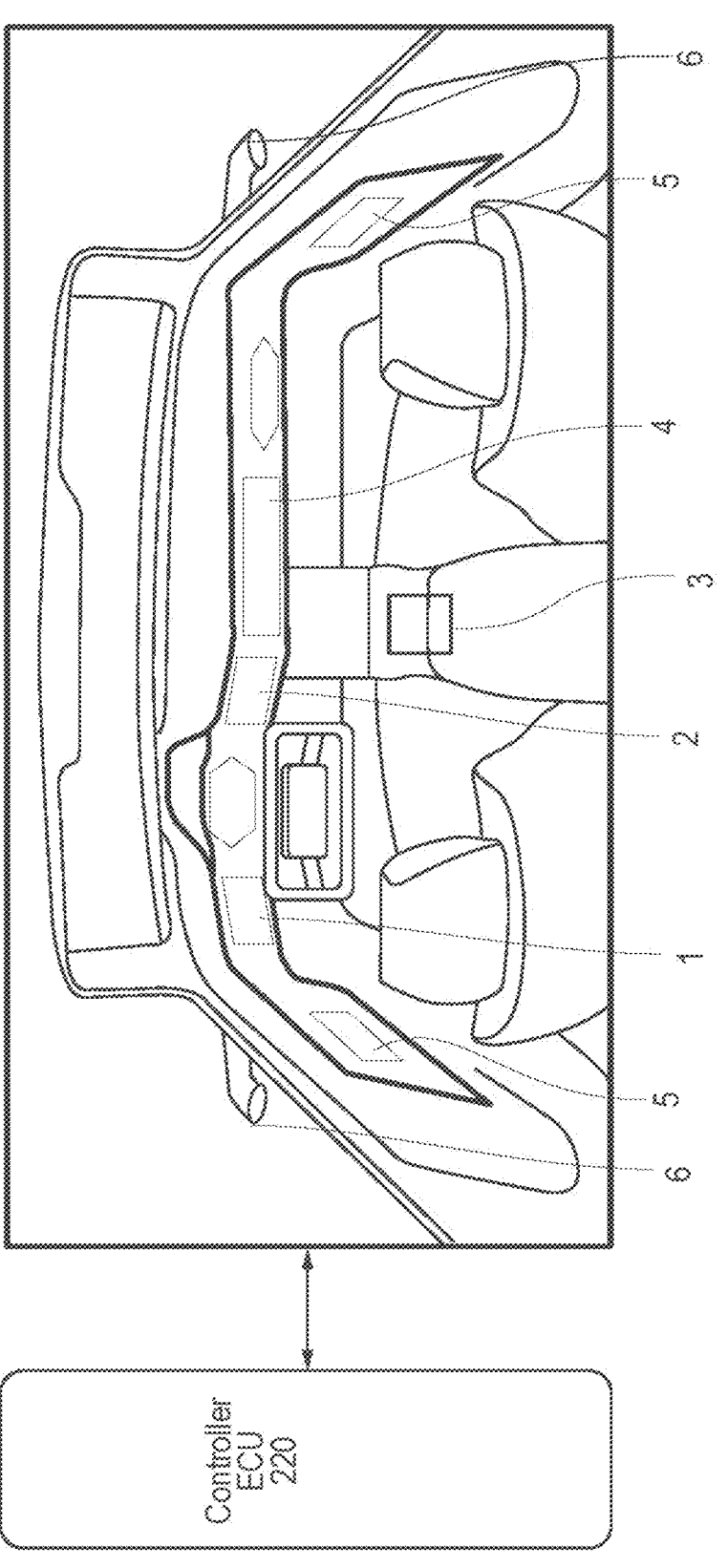
FIG. 18 is a front perspective view of an exemplary dashboard for an autonomous driving vehicle.

FIG. 18 is a front perspective view of an exemplary dashboard for an autonomous driving vehicle. As advancements are made in vehicle rear view capturing technology, cars may or may not have rear view mirrors. Mirrors may be replaced by so called "camera monitor systems" (CMS). In an example, CMS systems include rear view cameras that record the rear, lateral area of the car surroundings. The captured images or videos may be displayed in dedicated screens 1, 2. The locations and types of these screens are regulated by laws which may differ depending on the jurisdiction.

Referring to FIG. 18, the displayed rear view image provided by the one or more CMS systems is or may be duplicated on other screens 3, 4, 5, whereby the legally regulated areas for displaying of the rear view are not affected. In other words, images may be stitched from screen 1 and 2 together and displayed also on the central display 3, the wide screen of the dashboard 4, the door screens 5, or any other display in the car.

As a result of the arrangement of the displays 1, 2, 3, 4, 5, other passengers are also able to see the displayed image. Further, content can be projected onto the image that may not comply with legal requirements. For example, augmented reality applications for warning or other informational purposes may be projected onto the image.

In addition, such displayed images may also be used to adjust the FOV of the simulated mirror. In this example, the driver transfers the image from 1 to 3, adjusts the FOV with touch or gesture control on the HMI, and then sends the image back to screen 1.

Figure 26:
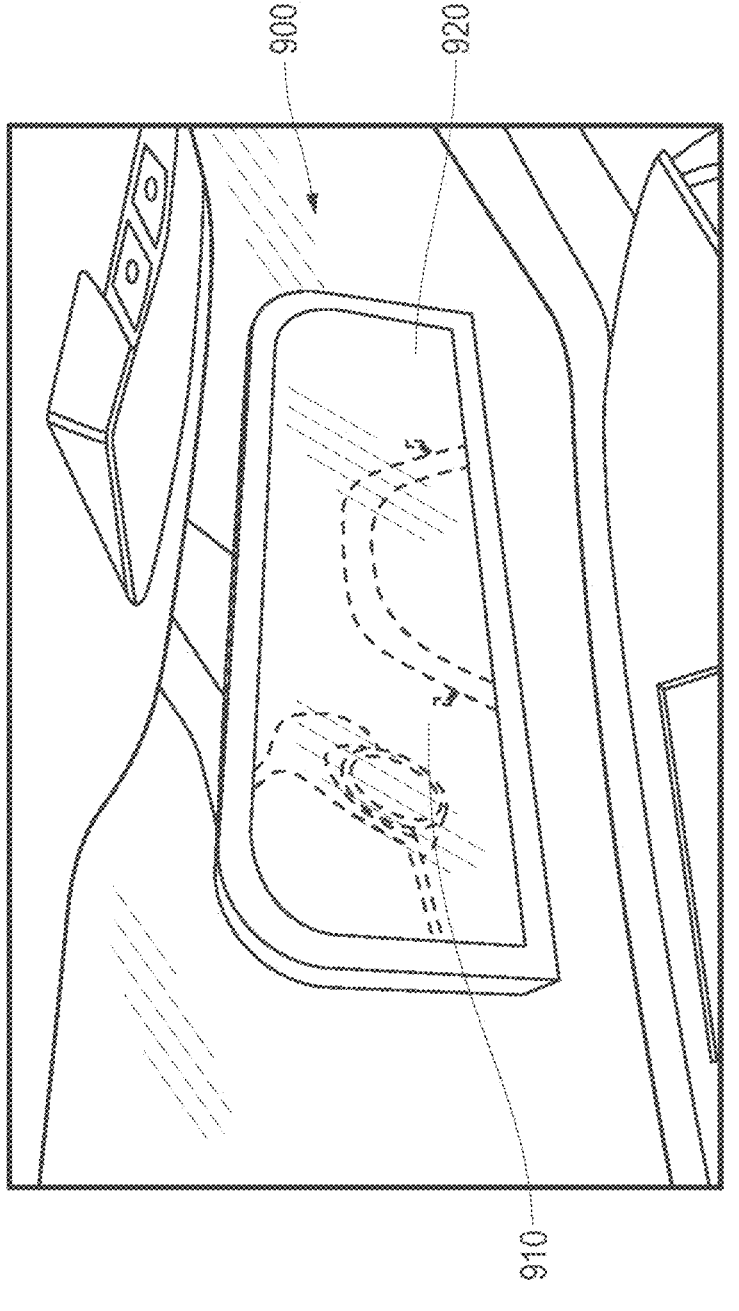
FIG. 26 is a front perspective view of an exemplary rear view display.

FIG. 26 is a front perspective view of an exemplary rear view display 900. Referring to FIG. 26, the rear view display 900 is in a position of a convention interior rearview mirror, and includes CMS information captured on the left side of a vehicle and CMS information captured on the right side of a vehicle which is combined and stitched together. The information captured from the left side is displayed on the left side 910 of the display 900, and the information captured from the right side is displayed on the right side 920 of the display 900. Such displays are well known to a person having ordinary skill in the art. For example, the arrangement and algorithms used with a display such as display 900 are described in German Patent Application Publication No. 10 2014 213536 A1 and counterpart U.S. Patent Application Publication No. 2017/116710 A1.

However, in certain jurisdictions, the ISO standard requires that information captured from the left side of a vehicle must be displayed on a display to the left of the driver and information captured from the right side of a vehicle must be displayed on a display to the right of the driver. In particular, the ISO standard includes rules on the location of CMS information to the left of the driver for information captured on the left side and to the right of the driver for information captured from the right side. The reason is that drivers tend to look to the particular side that they sense a danger exists, for example, based on the noise of another vehicle from that side. Thus, a display should be on the same side as the side where the image is being captured. This arrangement is mandatory in a number of jurisdictions including Europe, Japan, and Korea.

To meet regulatory requirements while providing a conveniently displayed and combined, stitched image, a system and algorithm may be used for displaying a stitched image (hereinafter "a comfort display") or separate images on a display to the left and right of a vehicle occupant (hereinafter "an ISO-compliant display").

Referring back to FIG. 18, a CMS system may include an electronic control unit (ECU) 220 in communication with screens or displays 1, 2, 3, 4, 5, a left side image capturing device 6 such as a left side camera or sensor, a right side image capturing device 6 such as a right side camera or sensor, and other vehicle units for receiving inputs from the vehicle on vehicle speed, number of lanes on the driving road, current driving lane, time of driving, blind spot detection, among other inputs. The ECU 220 may also be in communication with a display 900 which is capable of displaying a comfort display. Further, any one or more of the displays 1, 2, 3, 4, 5, 900 may be capable of displaying a comfort display or a left or right part of an ISO-compliant display. In this example, the ECU 220 may be the same ECU 220 which is also in communication with the sensor arrangements 210 or may be a different ECU 200 which is not in communication with the sensor arrangements 210.

A CMS system, as described, may provide the required mirror/CMS information in the most convenient way, maintain improved safety features by combining the information from the vehicle, the ADAS system and the CMS, switch to safe and ISO-compliant information when required, and free the displays 1, 2, 3, 4, 5, 900 for other purposes when they are not required for the CMS.

Figure 27:
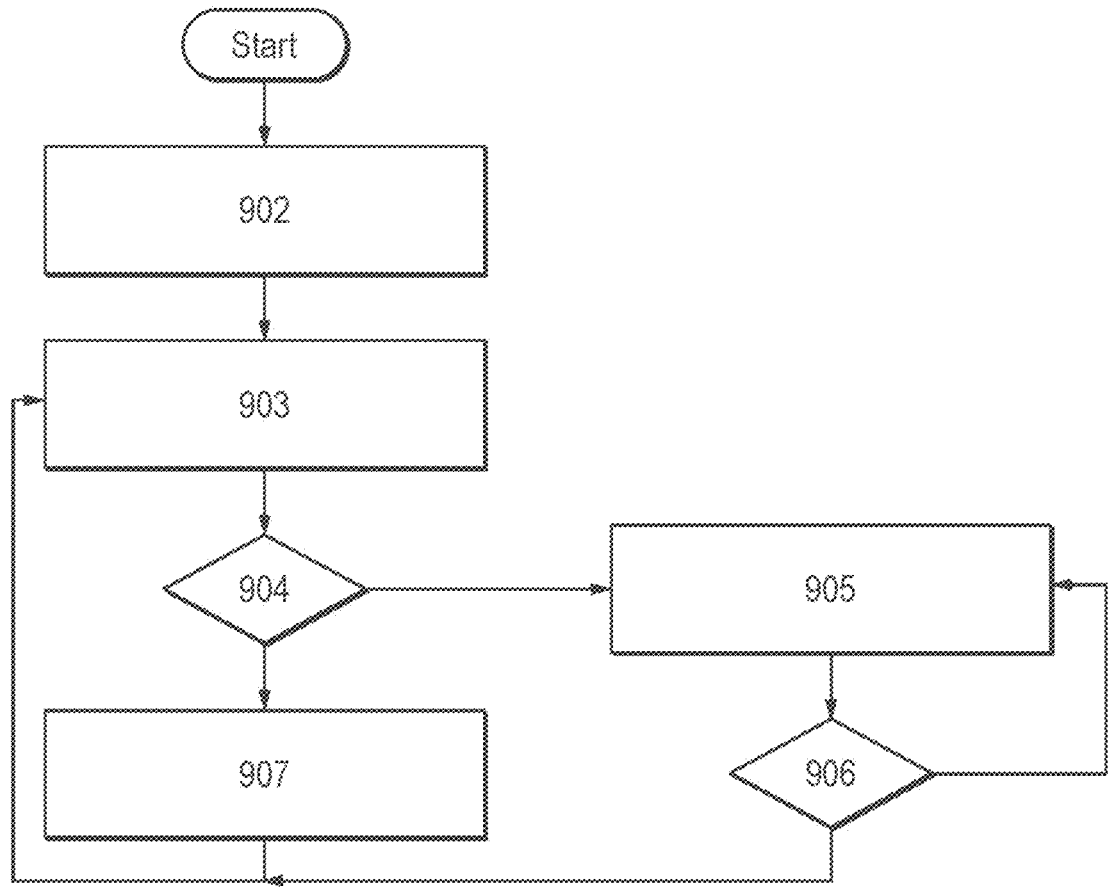
FIG. 27 is a flow chart illustrating an exemplary process for displaying one or images on one or more displays.

FIG. 27 is a flow chart illustrating an exemplary process for displaying one or more images on the one or more displays 1, 2, 3, 4, 5, 900. In this example, the process may be initiated at first step 902 after a start step, in which the CMS system initiates a self-test to determine whether the displays 1, 2, 3, 4, 5, 900, ECU 220, image capturing devices 6, and all components are operating properly. At the first step 902, if any malfunctions are detected, the system may indicate the detected malfunctions to the user 100 or may initialize a programmed malfunction protocol to self-cure the one or more detected defects. In this example, in the next step 903, the ECU 220 may read or receive vehicle data from one or more vehicle units to evaluate driving conditions. For example, the ECU 220 may receive inputs from the vehicle on vehicle speed, number of lanes on the driving road, current driving lane, time of driving, blind spot detection, among other inputs. In the next step 904, the ECU 220 may evaluate whether it is safe to display a comfort display or whether an ISO-compliant display should be displayed. An example of the inputs which may be evaluated to determine whether a comfort display or ISO-compliant display should be displayed is provided below. In the next step 905, in response to determining that an ISO-compliant display should be displayed, an ISO-compliant display is calculated and displayed on one or more of the displays 1, 2, 3, 4, 5, 900. In step 906, the ECU 220 may continue to evaluate inputs to determine whether it is safe to display a comfort display or whether an ISO-compliant display should be displayed. If it is determined to be safe to display a comfort display in step 906 or 904, a comfort display may be calculated and displayed on one or more of the displays 1, 2, 3, 4, 5, 900 in step 907. After a comfort display is displayed, the process may revert back to step 903 of receiving or reading inputs using the ECU 220.

In an example, the ISO-compliant display may be displayed in a single display of the displays 1, 2, 3, 4, 5, 900. That is, if a display 1, 2, 3, 4, 5, 900 is large enough, the full CMS may be shown in a window or overlay. Displaying in a single display may provide additional awareness for the danger situation and better catch the attention of a driver 100. Also, once the danger is determined to be no longer at issue, the ISO-compliant CMS image can fade into a comfort display instead of switching off the display 1, 2, 3, 4, 5, 900 or returning it to its original content.

In one example, the criteria for determining whether a comfort display should be used, i.e. whether it is safe to use a comfort display, or whether an ISO-compliant display should be used, is provided in Table 2.

TABLE 2

| | | | | | | |
|---|---|---|---|---|---|---|
| Criteria for Safe/Unsafe Driving and Comfort Display | | | | | | |
| Speed km/h | Variety speed In km/h | Duration | Number of lanes | Blind spot warning | Brakes activation >0.1 g | Decision |
| <6 | x | x | x | x | x | show full CMS |
| >6 | +/−10 km/h | 1 minute | 1 | off | no | show comfort CMS |
| >6 | x | x | >1 | off | no | show comfort CMS |
| x | x | x | x | x | yes | show full CMS |
| x | x | x | x | on | x | show full CMS |

In Table 2, an x signifies that the input is not used for a particular scenario. Thus, in the first example, when the speed of the vehicle is less than 6 km/h, the full CMS is displayed. In another example, when the speed is greater than or equal to 6 km/h, the speed ranges +/–10 km/h for a duration of 1 minute, there is 1 lane, the blind spot warning is off, and there is no break activation, the comfort display is shown. In another example, when the speed is greater than or equal to 6 km/h and there is more than one lane, the comfort display is shown. In further examples, when the brake is activated, the full CMS is shown, or when the blind spot warning is on, the full CMS is shown. These examples are only provided for explanation, and it should be appreciated that the inputs for determining whether or not it is safe to show a comfort display are not limited to these examples.

Systems and Methods for Decoupling Haptic Feedback on A Vehicle Internal Component Surface.

Figures 28A, 28B:
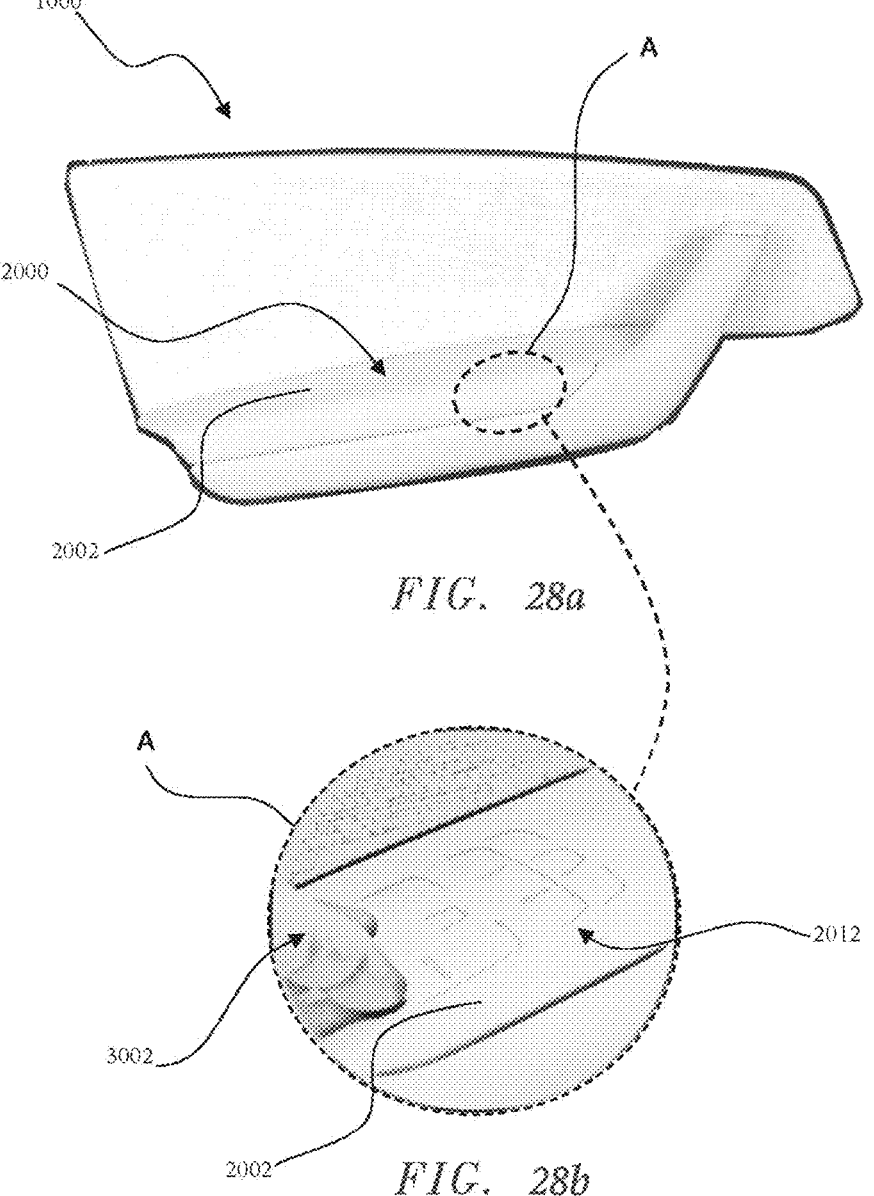

FIG. 28a illustrates an embodiment of an internal vehicle component 1000. The internal vehicle component 1000 may include, but not limited to, one of a door trim, a center console, an instrument panel or a combination of these components thereof. In the illustrated embodiment, the internal vehicle component 1000 is a door trim, however the internal vehicle component 1000 may be any component having a touch sensitive surface 2002. The internal vehicle component 1000 may be incorporated with a system 2000 for decoupling haptic feedback on the touch sensitive surface 2002. The term "touch sensitive surface" may be interchangeably used with the term "surface" throughout the description. The term "haptic feedback" refers to a mechanical vibration or a feeling of touch received by a user in response to an input provided by the user. For example, when a user presses a button or marking on a touch surface of a system, the user receives a mechanical vibration produced by the system which can be felt through their sense of touch. This mechanical vibration received in response to the user's input is what is referred to as haptic feedback.

The internal vehicle component 1000 as shown in FIG. 28a, includes the system 2000 having the surface 2002. The surface 2002 may have at least one marking 2012. The at least one marking 2012 refers to input location where a user provides input to the system 2000. In the embodiment of FIG. 28a, the at least one marking 2012 may be used for controlling window glass of the door or adjusting rear view mirror of the vehicle.

FIG. 28b illustrates an enlarged view of a portion "A" of FIG. 28a. The surface 2002 includes at least one marking 2012. The at least one marking 2012 is used to provide input from the user's finger 3002. The user provides input to the system 2000 by pressing or tapping at the at least one marking 2012. On receipt of the input from the user, the system 2000 provides one or more haptic feedback in the form of vibration to the surface 2002 at the at least one marking 2012 where the user presses or taps the surface 2002. The at least one marking 2012 may include a translucent portion to light up the input location, or can be a perforated non translucent material. The at least one marking 2012 may be made of material having different stiffness from the stiffness of the material of the surface 2002 such that a local change in the stiffness may be observed by the user to identify the input location.

Figure 29G:
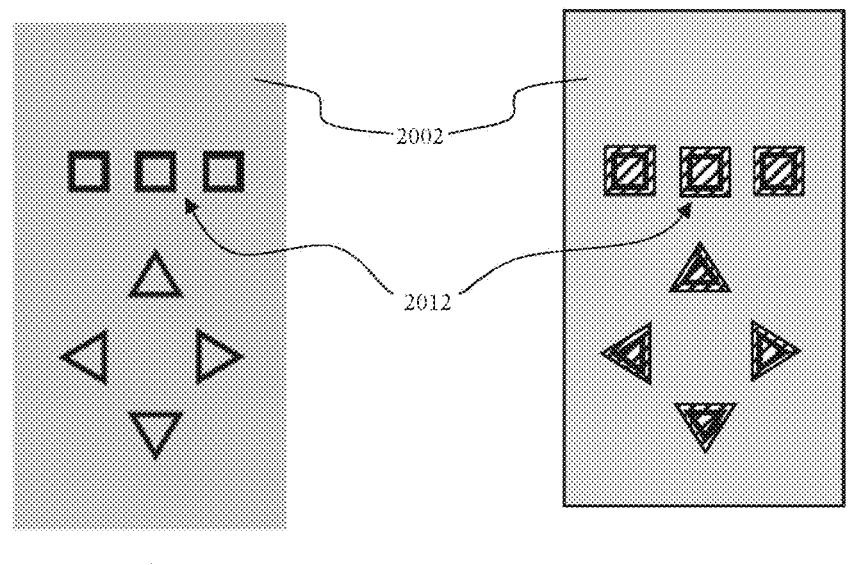
Figure 29G:
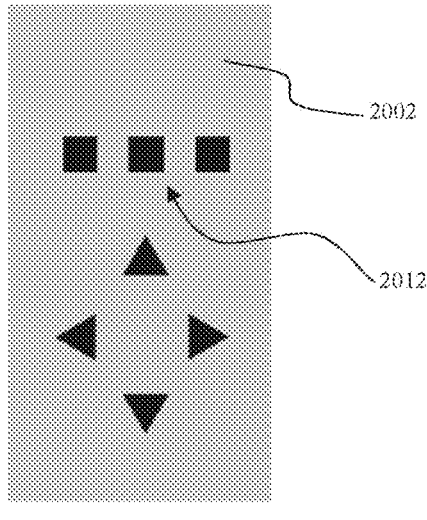

FIG. 29a to 29g illustrates various embodiments of the at least marking 2012. FIGS. 29a and 29b illustrate the surface 2002 with at least one marking 2012. The surface 2002 is laminated with a translucent soft material. The translucent soft material is masked with a non-translucent layer. Outer periphery of the at least one marking 2012 includes a non-masked area which may light up when required, such as in case of dark environment, when an illuminating component 2018 (shown in FIG. 30) is turned on. FIG. 29a illustrates the surface 2002 when the outer periphery of the at least one marking 2012 are not lit up, i.e. the illuminating component 2018 is turned off. FIG. 29b illustrates the surface 2002 when the outer periphery of the at least one marking 2012 are lit up, i.e. the illuminating component 2018 is turned on. The illuminated outer periphery of the at least one marking 2012 is shown by the hatching lines in FIG. 29b.

In FIGS. 29c and 29d, the surface 2002 is laminated with a translucent soft material. The translucent soft material is masked with a non-translucent layer. Inner portion of the at least one marking 2012 includes non-masked area which may light up when required, such as in case of dark environment when an illuminating component 2018 (shown in FIG. 30) is turned on. FIG. 29c illustrates the surface 2002 when the inner portion of the at least one marking 2012 are not lit up, i.e. the illuminating component 2018 is turned off. FIG. 29d illustrates the surface 2002 when the inner portion of the at least one marking 2012 is lit up, i.e. the illuminating component 2018 is turned on. The illuminated inner portion of the at least one marking 2012 is shown by the hatching lines in FIG. 29d.

In FIGS. 29e and 29f, the surface 2002 is laminated with a translucent soft material. The translucent soft material is masked with a non-translucent layer. Inner and outer periphery of the at least one marking 2012 includes a non-masked area which may light up when required, such as in case of dark environment, when an illuminating component 2018 (shown in FIG. 30) is turned on. FIG. 29e illustrates the surface 2002 when the inner and the outer periphery of the at least one marking 2012 are not lit up, i.e. the illuminating component 2018 is turned off. FIG. 29f illustrates the surface 2002 when the inner and the outer periphery of the at least one marking 2012 is lit up, i.e. the illuminating component 2018 is turned on. The illuminated inner and outer periphery of the at least one marking 2012 is shown by the hatching lines in FIG. 29f.

In FIG. 29g, the at least one marking 2012 is be made of different material having different stiffness for identification of the at least one marking 2012 on the surface 2002. In an embodiment the at least one marking may be made from embossing structure, stamping icons and/or digital printing icons. The advantage of having the at least one marking 2012 with different stiffness is that the at least one marking 2012 can be identified by the user easily since different stiffness provides different touch feeling to the user. Another advantage of having the at least marking with different stiffness is that a better haptic feedback may be received by the user because of stiff material of the at least one marking enhances the transmission the vibration. In an embodiment, the at least one marking 2012 is made of conductive material. The advantage of having the at least one marking made of conductive material is that the sensitivity of capacitive touches is enhanced.

FIG. 30 illustrates a cross sectional view of the system 2000. The system 2000 may be incorporated inside the internal vehicle component 1000. The system 2000 includes the surface 2002 which may be adapted to interact with the user via the at least one marking 2012.

The system 2000 further comprises a carrier plate 2004. The carrier plate 2004 is a rigid structure which supports the system 2000. The carrier plate is made of Propylene Carbonate (PC), Acrylonitrile Butadiene Styrene (ABS), Polypropylene (PP) or a blend of these materials optionally with or without filler and/or reinforcement such as talc, glass fiber. The carrier plate 2004 may act as a frame to provide rigidity to the system 2000. The system 2000 further comprises at least two Printed Circuit Boards (PCB) 2006. The at least two PCB 2006 are supported on the carrier plate 2004. As shown in FIG. 30, the at least two PCB 2006 comprises a first PCB 2006a, a second PCB 2006b and a third PCB 2006c. Each PCB 2006a, 2006b, 2006c has at least one sensor 2008. The at least one sensor 2008 is disposed on each PCB 2006a, 2006b, 2006c and is configured to detect the user's input. As shown in FIG. 30, the at least one sensor 2008 comprises at least one first sensor 2008a, at least one second sensor 2008b and at least one third sensor 2008c. The at least one first sensor 2008a corresponds to the first PCB 2006a, the at least one second sensor 2008b corresponds to the second PCB 2006b and the at least one third sensor 2008c corresponds to the third PCB 2006c. The at least one sensor 2008 is also configured to transmit the detected input to the corresponding PCB 2006a, 2006b, 2006c.

The surface 2002 further comprises an overlay layer 2010 having at least one marking 2012. The overlay layer 2010 is made of soft material such as genuine or artificial leather, Polyvinyl chloride (PVC), Thermoplastic polyurethane (TPU) or Thermoplastic olefin (TPO) foil or textile. As shown in FIG. 30, the at least one marking 2012 comprises at least one first marking 2012a, at least one second marking 2012b and at least one third marking 2012c. The at least one first marking 2012a is disposed vertically above the at least one first sensor 2008a. The at least one second marking 2012b is disposed vertically above the at least one second sensor 2008b. The at least one third marking 2012c is disposed vertically above the at least one third sensor 2008c. The vertical position of the at least one marking 2012 and the at least one sensor 2008 allows the user to find the input location more easily. The overlay layer 2010 allows the user's input to be transferred to the at least one sensor 2008. The user's input may be in the form of a tapping or a pressing force F1. When a user presses or taps on the surface 2002 at the at least one marking 2012, the overlay layer 2010 allows the pressing/tapping force F1 to reach the at least one sensor 2008. The at least one sensor 2008 then detects the pressing or tapping force F1 and transmits the input signal to the corresponding PCB 2006a, 2006b, 2006c. The at least one sensor 2008 may include one of a switch, a button, a touch sensor, a pressure sensor or a combination thereof. In an embodiment, the at least one sensor 2008 is a switch.

The system 2000 further includes at least two actuators 2016. Each PCB 2006a, 2006b, 2006c is connected to an actuator 2016. As shown in FIG. 30, the first PCB 2006a is operably connected to a first actuator 2016a, the second PCB 2006b is connected to a second actuator 2016b and the third PCB 2006c is connected to a third actuator 2016c. The at least two actuators 2016 are configured to provide haptic feedback in the form of vibration to the corresponding PCB 2006. The at least two actuators 2016 provide the haptic feedback in the form of vibration G1 and transmit the vibration G1 to the corresponding PCB 2006. The at least two PCB 2006 are configured to receive the input signal detected by the at least one sensor 2008 and to provide actuating signal to the corresponding actuator 2016. In embodiments, the actuator 2016 may also include a mechanism, such as a moveable rod or pin, that causes the at least one marking 2012 to rise or pop-up when activated, for example as described above with reference to FIGS. 13-16.

The system 2000 further comprises a compressible layer 2014. The compressible layer 2014 is disposed between the at least two PCB 2006 and the overlay layer 2010. When the user presses or taps the surface 2002, the compressible layer 2014 is compressed and the pressing force F1 is transmitted to the at least one sensor 2008 via a compressed region 4002 (shown in FIG. 33a and FIG. 33b) of the compressible layer 2014. The compressible layer 2014 is compressed only in the compressed region 4002, and rest of the compressible layer 2014 is not compressed. Thus, in a compressed state, the compressible layer 2014 is divided into the compressed region 4002 and a non-compressed region 4004 (shown in FIG. 33a and FIG. 33b). The compressible layer 2014 transmits the user's input to the at least one sensor 2008 via the compressed region 4002. In response to the user's input, the system 2000 provides haptic feedback via the actuator 2016. The haptic feedback is transmitted to at least one of the at least two PCB 2006 and then to the surface 2002 at the least one marking 2012 via the compressed region 4002 of the compressible layer 2014. The compressible layer 2014 absorbs the haptic feedback in the non-compressed region 4004 and only transmits the feedback via the compressed region 4002. Thus, the feedback is received by the user in a locally limited portion of the surface 2002 and not on the entire surface 2002. The locally limited portion of the surface 2002 is the portion of the surface 2002 on and around the at least one marking 2012 at which the user presses or taps the surface 2002. This localized receipt of feedback is advantageous to avoid confusion to the user, and the user can accurately identify the location of the feedback.

The compressible layer 214 is made of material including, but not limited to, one of polyvinyl chloride (PVC), polyurethane (PU) thermoplastic polyurethane (TPU), thermoplastic olefin (TPO) or any other material that may be used to create internal vehicle component 1000. In an embodiment, the compressible layer 2014 may include 3D-mesh structure. The compressible layer 2014 has a density ranging from 20 kg/m$^3$ to 90 kg/m$^3$. The density of the compressible layer 2014 allows the compressible layer 2014 to be easily compressed and decompressed.

In an embodiment, the system 2000 may comprise an illuminating component 2018 disposed above the at least two PCB 2006. The illuminating component 2018 is positioned vertically below the at least one marking 2012, shown in FIG. 30. The illuminating component 2018 may include a light emitting diode (LED) or a lightguide. The illuminating component 2018 enables the at least one marking 2012 to be illuminated, which is useful in finding the location of the at least one marking 2012 even in dark environment.

The system 2000 further comprises a decoupling material 2020 for supporting the at least two PCB 2006 vertically above the carrier plate 2004. The decoupling material 2020 absorbs the vibration provided by the actuator 2016 and prevents the vibration to reach the carrier plate 2004. Thus, the decoupling material 2020 helps in making the system 2000 stable by preventing the vibration to be transmitted to the carrier plate 2004.

The system 2000 may be divided into a first zone P1, a second zone P2 and a third zone P3. The first zone P1 includes the first PCB 2006a, the at least one first sensor 2008a, the at least one first marking 2012a and the first actuator 2016a. The second zone P2 includes the second PCB 2006b, the at least one second sensor 2008b, the at least one second marking 2012b and the second actuator 2016b. The third zone P3 includes the third PCB 2006c, the at least one third sensor 2008c, the at least one third marking 2012c and the third actuator 2016c. The carrier plate 2004, the compressible layer 2014 and the overlay layer 2100 is common for all the zones P1, P2 and P3.

FIG. 31 illustrates a cross sectional view of the system 2000 showing the manner in which the user may provide input to the system 2000. A user's hand 3000 is shown in FIG. 31 in which the user's first finger 3002 and second finger 3004 are placed on the surface 2002. The first finger 3002 is placed at the at least one second marking 2012*b* and the second finger 3004 is placed at the at least one third marking 2012*c*. The user presses or taps the surface 2002 using the first finger 3002 and the second finger 3004. The user may provide different inputs using different fingers independently and/or simultaneously. As shown in FIG. 31, the user presses the surface 2002 at the at least one second marking 2012*b* (shown in FIG. 30) by a pressing force F1 and at the at least one third marking 2012*c* by a pressing force F2. The at least one second sensor 2008*b* (shown in FIG. 30) detects the force F1 and transmits the input signal to the second PCB 2006*b*. The at least one third sensor 2008*c* detects the force F2 and transmits the input signal to the third PCB 2006*c*. In response to the user's input force F1, the system 2000 actuates the second actuator 2016*b* and the second actuator 2016*b* transmits the haptic feedback in the form of vibration G1 to the second PCB 2006*b*. The haptic feedback in the form of vibration G1 is then transmitted to the surface 2002 at the at least one second marking 2012*b* (shown in FIG. 30). In response to the user's input force F2, the system 2000 actuates the third actuator 2016*c* and the third actuator 2016*c* transmits the haptic feedback in the form of vibration G2 to the third PCB 2006*c*. The haptic feedback in the form of vibration G2 is then transmitted to the surface 2002 at the at least one third marking 2012*c* (shown in FIG. 30). In an embodiment, two input forces F1 and F2 may have different magnitudes and the two haptic feedbacks in the form of vibration G1 and G2 may also have different magnitudes and/or frequencies. In another embodiment, two forces F1 and F2 may have same magnitudes and the two haptic feedbacks in the form of vibrations G1 and G2 may also have same magnitudes and/or frequencies. Alternatively, the user may provide one input by pressing the surface 2002 and other input by tapping the surface 2002, and the system 2000 may provide same or different haptic feedbacks for these inputs. Thus, two or more same or different inputs may be provided by the user and for each input independent feedback may be provided by the system 2000. The two feedbacks are independent of each other and hence do not interfere with each other. In other embodiment, three or more inputs may be provided to the system 2000 and independent feedbacks for each input may be provided by the system 2000 in which the feedbacks do not interfere with one another.

Figure 32:
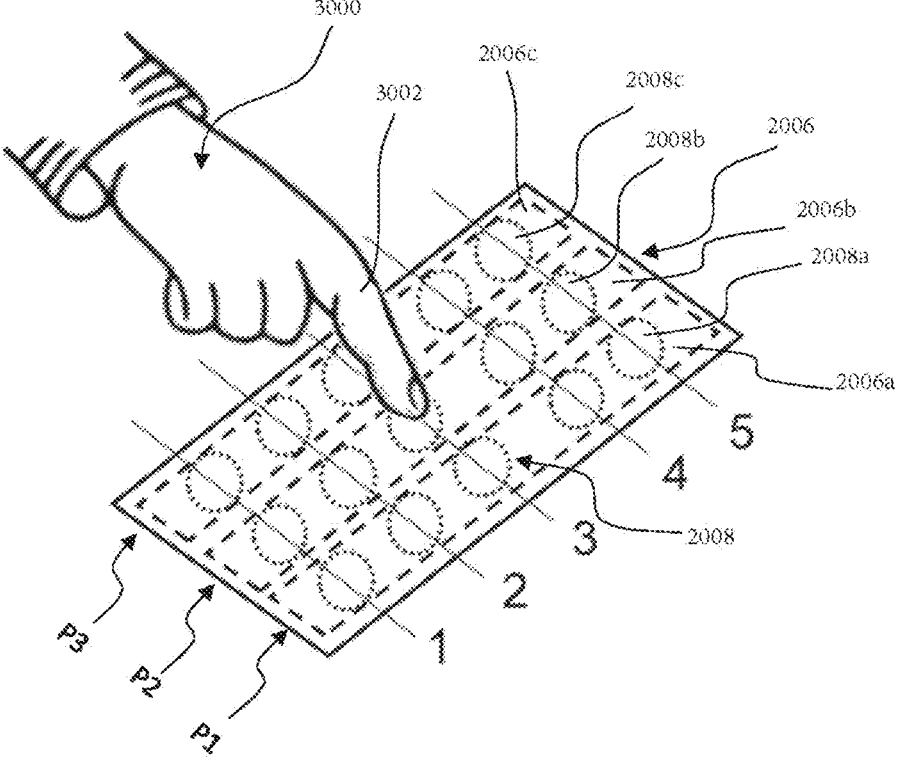
FIG. 32 illustrates a perspective view of arrangement of PCBs into three zones according to the present disclosure.

FIG. 32 illustrate a perspective view of the arrangement of the at least two PCB 2006 in three zones P1, P2 and P3. The first PCB 2006*a*, the second PCB 2006*b* and the third PCB 2006*c* are arranged linearly. Each PCB 2006*a*, 2006*b*, 2006*c* has at least one sensor 2008. The first PCB 2006*a* has the at least one first sensor 2008*a*, where in the illustrated embodiment the at least one first sensor 2008*a* includes five sensors 1,2,3,4,5 arranged linearly along the length of the first PCB 2006*a*. The second PCB 2006*b* has the at least one second sensor 2008*b*, where in the illustrated embodiment the at least one second sensor 2008*b* includes five sensors 1,2,3,4,5 arranged linearly along the length of the second PCB 2006*b*. The third PCB 2006*c* has the at least one third sensor 2008*c*, where in the illustrated embodiment, the at least one third sensor 2008*c* includes five sensors 1,2,3,4,5 arranged linearly along the length of the third PCB 2006*c*. The first PCB 2006*a* is connected to the first actuator 2016*a*, the second PCB 2006*b* is connected to the second actuator

2016*b* and the third PCB 2006*c* is connected to the third actuator 2016*c* (shown in FIGS. 30 and 31). The first PCB 2006*a*, the first actuator 2016*a* and the at least one first sensors 2008*a* (1,2,3,4,5) belong to the first zone P1. The second PCB 2006*b*, the second actuator 2016*b* and the at least one second sensors 2008*b* (1,2,3,4,5) belong to the second zone P2. The third PCB 2006*c*, the third actuator 2016*c* and the at least one third sensors 2008*c* (1,2,3,4,5) belong to the third zone P3. Thus, each zone P1, P2 and P3 has one actuator 2016 for transmitting haptic feedback to the corresponding PCB 2006*a*, 2006*b*, 2006*c*. The first PCB 2006*a* receives the haptic feedback in the form of vibration from the first actuator 2016*a* and transmit the haptic feedback to the at least one first marking 2012*a* via the compressed region 4002 (shown in FIGS. 33*a* and 33*b*) of the compressible layer 2014 when the at least one first sensor 2008*a* (1,2,3,4,5) detects input by the user. The second PCB 2006*b* receives haptic feedback in the form of vibration from the second actuator 2016*b* and transmit the haptic feedback to the at least one second marking 2012*b* via the compressed region 4002 (shown in FIGS. 33*a* and 33*b*) of the compressible layer 2014 when the at least one second sensor 2008*b* (1,2,3,4,5) detects input by the user. Similarly, the third PCB 2006*c* receives haptic feedback in the form of vibration from the third actuator 2016*c* and transmit the haptic feedback to the at least one third marking 2012*c* via the compressed region 4002 (shown in FIGS. 33*a* and 33*b*) of the compressible layer 2014 when the at least one third sensor 2008*c* (1,2,3,4,5) detects input by the user. The compressible layer 2014 dampens the haptic feedback except at the compressed region (4002) and only transmit the haptic feedback at the markings 2012*a*, 2012*b*, 2012*c* where user presses or taps the surface 2002. As shown in FIG. 32, the user is shown placing his finger 3002 on the second zone P2.

Figures 33A, 33B:
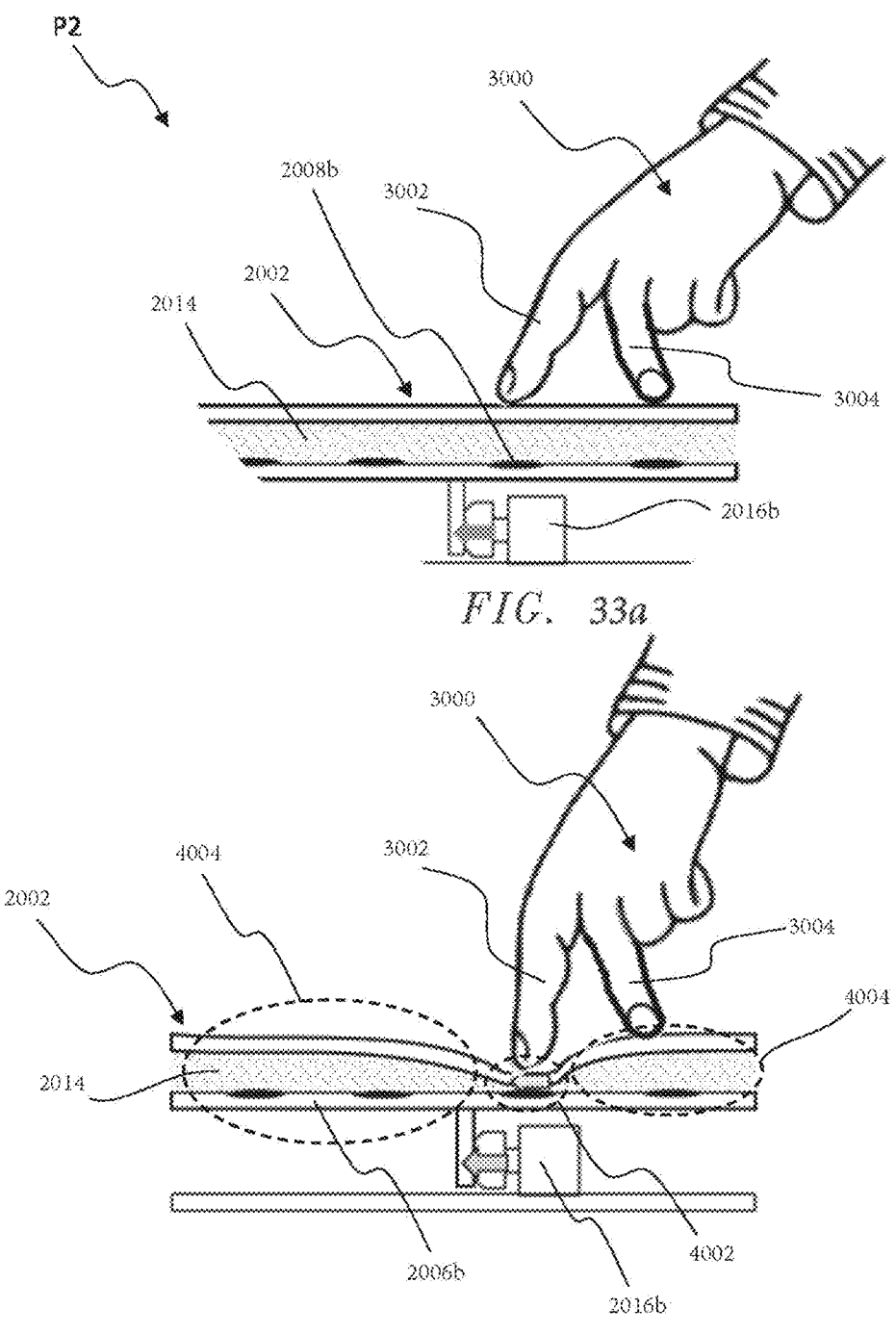
FIG. 33a illustrates a cross sectional view of one zone showing the compressible layer in non-compressed state.
FIG. 33b illustrates a cross sectional view of one zone showing the compressible layer in a compressed state.

FIG. 33*a* illustrates the arrangement of the system 2000 in the second zone P2 shown in FIG. 32 when the user has not provided the input, and FIG. 33*b* illustrates the arrangement of the system 2000 in the second zone P2 when the user has provided the input. As shown in FIG. 33*a*, the user's first finger 3002 and the second finger 304 are placed on the surface 2002. In FIG. 33*b* illustrate a state in which the user has provided the input by pressing the surface 2002 by the first finger 3002, and the second finger 3004 is laying on the surface 2002. As shown in FIG. 33*b*, the user presses the surface 2002 in zone P2 using the first finger 3002. The compressible layer 2014 is compressed when the input is received by the at least one second sensor 2008*b*. The compressible layer 2014 has a compressed region 4002 and a non-compressed region 4004. Once the input is received by the at least one second sensor 2008*b*, the second actuator 2016*b* is actuated and the feedback in the form of vibration is transmitted to the second PCB 2006*b*. The feedback is transmitted from the second PCB 2006*b* to the surface 2002 via the compressed region 4002 of the compressible layer 2014. The non-compressed region 404 of the compressible layer 2014 absorbs the feedback and does not transmit the same to the surface 2002 above the non-compressed region 4004 of the compressible layer 2014. Thus, the feedback is received at a locally limited portion of the surface 2002 only, where the user provides input and not on the entire surface 2002. That is to say, the feedback is received by the user by the first finger 3002, and no or minimum feedback is received by the second finger 3004.

In an alternate embodiment, the at least two PCB 2006 may be replaced by a rigid plate and the system 2 00 may comprise a controller (not shown) to perform the function of the at least two PCB. The controller may be connected to the rigid plate and the at least one sensor 2008. The controller may be configured to receive input from the at least one sensor 2008 and to actuate the actuator for providing haptic feedback.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

It will be appreciated by those skilled in the art that changes could be made to the embodiments described above without departing from the broad inventive concept thereof. It is understood, therefore, that the present disclosure disclosed herein is not limited to the particular embodiments disclosed, and it is intended to cover modifications within the spirit and scope of the present disclosure.

What is claimed is:

1. A system for providing haptic feedback on a surface of an internal vehicle component, the system comprising:
   a carrier plate having at least two distinct printed circuit boards, wherein each printed circuit board has at least one sensor;
   the surface of the internal vehicle component configured to receive input from a user, wherein the surface comprises an overlay layer having at least one marking for allowing a user to press the surface at the at least one marking, and wherein the at least one marking is positioned vertically above the at least one sensor; and
   a single compressible layer disposed between each of the at least two printed circuit boards and the overlay layer, wherein the single compressible layer is configured to compress and transmit the user input to the at least one sensor, wherein the single compressible layer is divided into a compressed region and a non-compressed region upon receipt of the input from the user;
   wherein each of the at least two printed circuit boards is connected to an actuator for providing haptic feedback on receipt of the user input by the at least one sensor, wherein each actuator is configured to provide independent feedback to the user; and
   wherein the single compressible layer is configured to transmit the haptic feedback to the surface via the compressed region of the single compressible layer and absorb the haptic feedback in the non-compressed region of the single compressible layer, wherein the haptic feedback is localized to a portion of the surface vertically aligned with the compressed region and is dampened in the non-compressed region.

2. The system of claim 1, further comprising at least on illuminating component positioned vertically below the at least one marking.

3. The system of claim 2, wherein the at least one marking includes a non-masked translucent layer.

4. The system of claim 2, wherein the at least one marking is a perforated non-translucent material.

5. The system of claim 1, wherein the at least one marking is made of a material having a stiffness different from a material of the surface.

6. The system of claim 1, wherein the at least one marking is made of conductive material.

7. The system of claim 1, further comprising a decoupling material disposed between the at least two printed circuit boards and the carrier plate.

8. The system of claim 1, wherein the at least one sensor is one of a push-button switch, a touch sensor, a pressure sensor, and a capacitive sensor.

9. The system of claim 1, wherein the single compressible layer has a density ranging from 20 kg/m$^3$ to 90 kg/m$^3$.

10. The system of claim 1, wherein the single compressible layer comprises one of polyvinyl chloride (PVC), polyurethane (PU), thermoplastic polyurethane (TPU), and thermoplastic olefin (TPO).

11. The system of claim 1, wherein the single compressible layer comprises a 3D-mesh structure.

12. The system of claim 1, wherein the internal vehicle component comprises at least one of a door trim, a center console, and an instrument panel of the vehicle.

13. The system of claim 1, wherein the carrier plate is a rigid plate made of Propylene Carbonate (PC), Acrylonitrile Butadiene Styrene (ABS), Poly propylene (PP) or a combination thereof.

14. The system of claim 1, wherein the haptic feedback is transmitted from the actuator to the surface via at least one of the at least two printed circuit boards and the compressed region of the single compressible layer.

15. The system of claim 1, wherein the overlay layer is made of genuine or artificial leather, Polyvinyl chloride (PVC), Thermoplastic polyurethane (TPU), or Thermoplastic olefin (TPO) foil or texture.

16. The system of claim 1, wherein the system is configured to receive two inputs from the user, wherein the user presses the surface at two markings simultaneously and receives two different localized feedback on the surface independently without interference.

* * * * *